(12) United States Patent
Kasahara

(10) Patent No.: US 10,936,382 B1
(45) Date of Patent: Mar. 2, 2021

(54) LOG OUTPUT DEVICE, LOG OUTPUT METHOD, AND LOG OUTPUT PROGRAM

(71) Applicant: JVCKENWOOD Corporation, Yokohama (JP)

(72) Inventor: Rikiya Kasahara, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 16/935,224

(22) Filed: Jul. 22, 2020

(30) Foreign Application Priority Data

Aug. 26, 2019 (JP) .............................. JP2019-153807

(51) Int. Cl.
*G06F 9/54* (2006.01)

(52) U.S. Cl.
CPC .............. *G06F 9/542* (2013.01); *G06F 9/546* (2013.01)

(58) Field of Classification Search
CPC .................................. G06F 9/542; G06F 9/546
See application file for complete search history.

(56) References Cited

U.S. PATENT DOCUMENTS

| 2014/0359375 A1* | 12/2014 | Longobardi | G06F 11/3476 714/45 |
| 2017/0010953 A1* | 1/2017 | Kyte | G06F 11/3636 |
| 2020/0134046 A1* | 4/2020 | Natanzon | G06F 16/1744 |

FOREIGN PATENT DOCUMENTS

JP  5430370  9/2011

* cited by examiner

*Primary Examiner* — Charles E Anya
(74) *Attorney, Agent, or Firm* — Amin, Turocy & Watson, LLP

(57) ABSTRACT

A first log storage unit and a second log storage unit that store, in units of events, log data of a plurality of different events sequentially occurring during execution of an application, and a log encoding unit that outputs, as compressed data, differential data between log data of a newest event and log data of a latest event which is a same type of event as the newest event and which occurs temporally latest to the newest event and is stored in the second log storage unit are included.

6 Claims, 18 Drawing Sheets

FIG.9
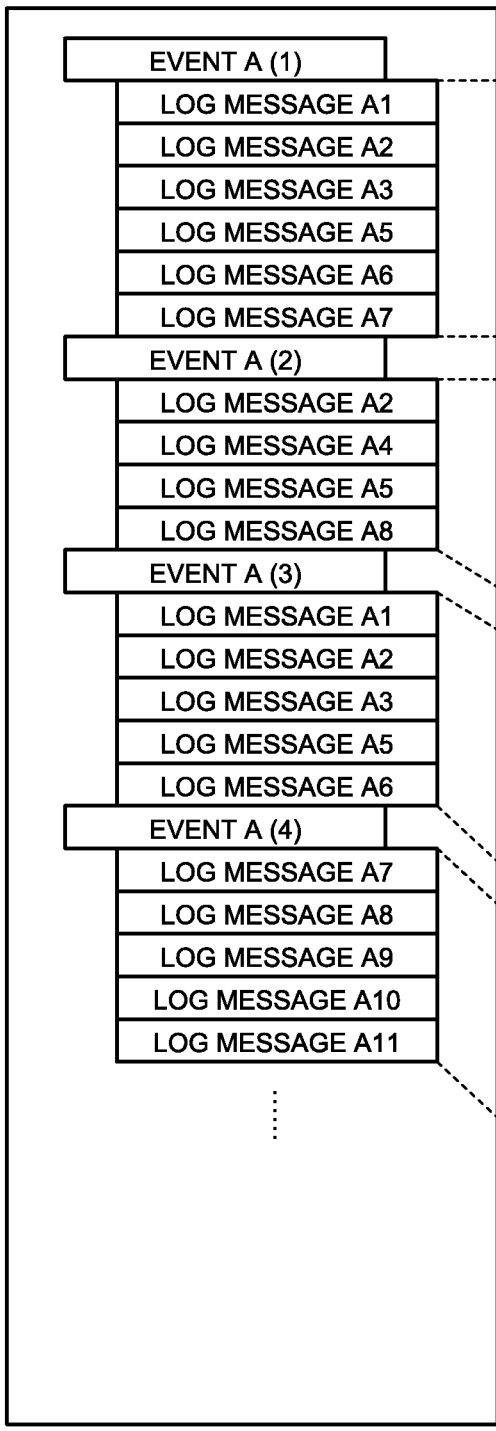
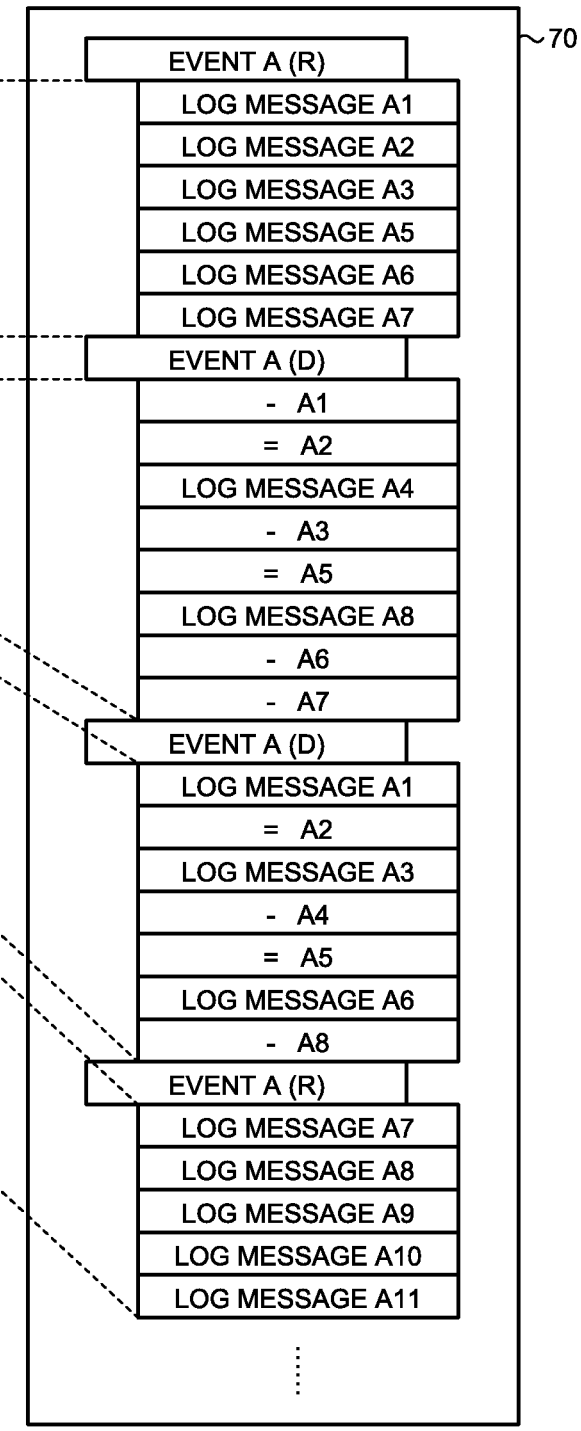

FIG.18
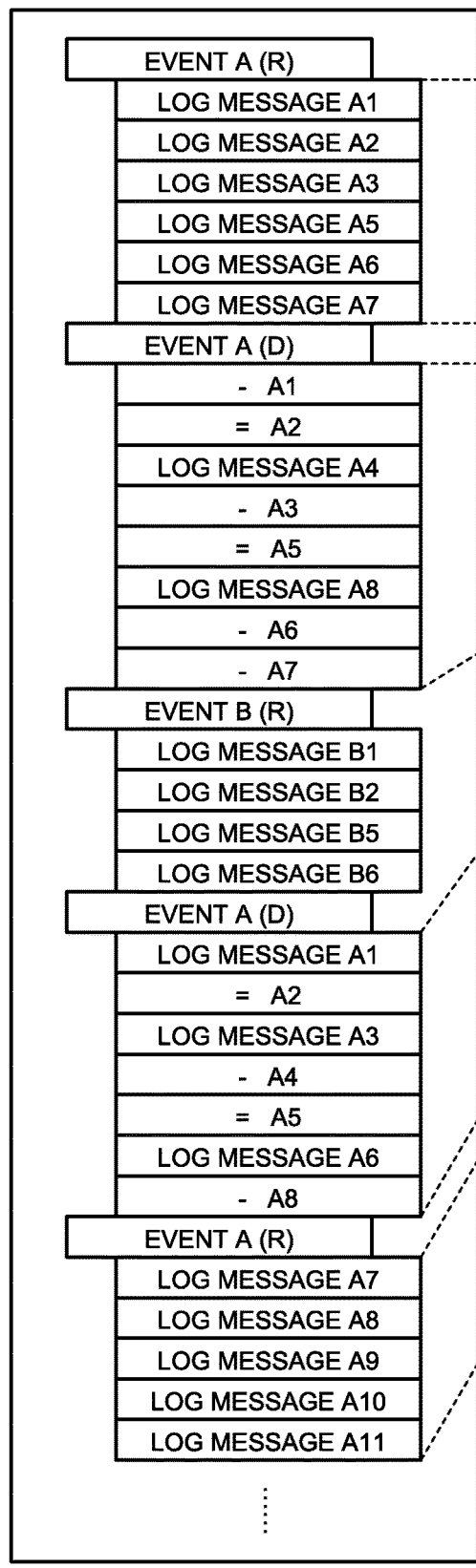
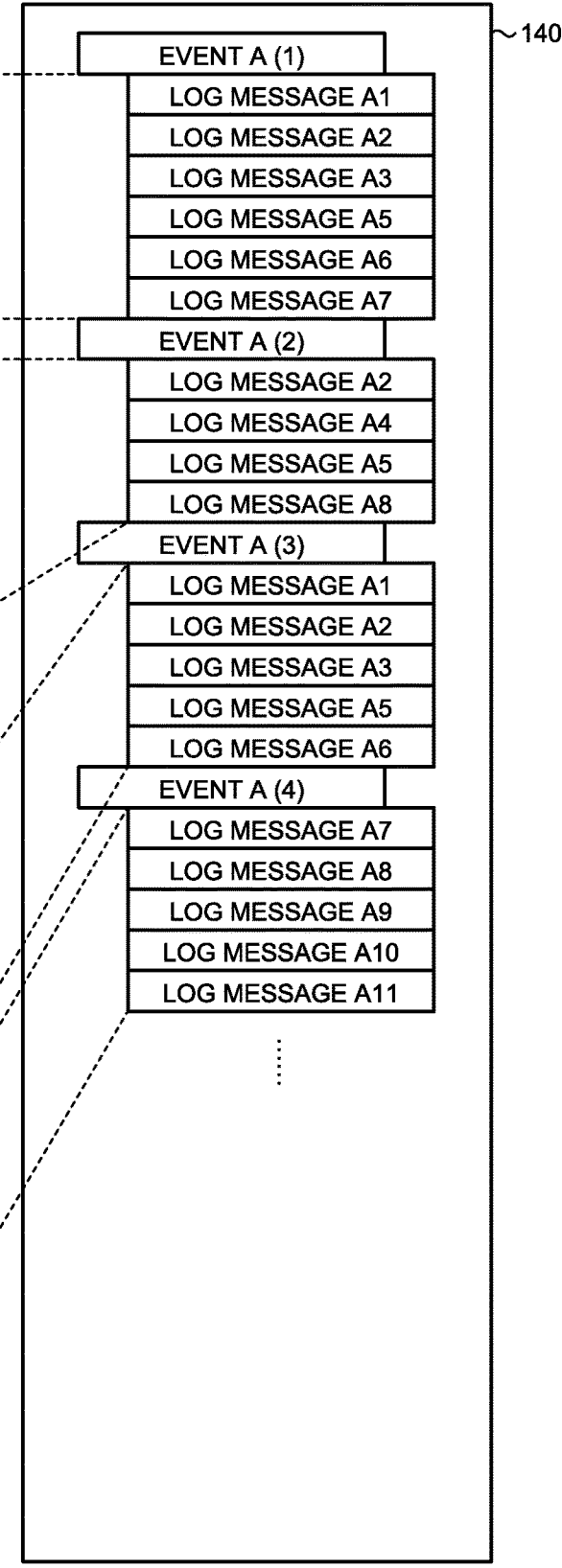

LOG OUTPUT DEVICE, LOG OUTPUT METHOD, AND LOG OUTPUT PROGRAM

CROSS-REFERENCE TO RELATED APPLICATIONS

This application claims priority from Japanese Application No. 2019-153807, filed on Aug. 26, 2019, the contents of which are incorporated by reference herein in its entirety.

BACKGROUND

1. Technical Field

The present disclosure relates to a log output device, a log output method, and a log output program that output log data in which an operation history of an application is recorded.

2. Description of the Related Art

It is a common practice to record the operation history of an application in order to analyze the operation status of the application and identify a problem portion when an unexpected situation occurs. This operation history is called log data, and the operation history of various controls at the time of application execution is output to and recorded in a recording device (e.g., a hard disk). Normally, log data is accumulated over time, becomes large, and compresses the free space of the recording device. Hence, when the data size reaches a specified value or a certain period of time elapses, controls such as deletion or movement of the log data are required. Japanese Patent No. 5430370 discloses a technique of compressing an amount of data of log data for transmitting log data.

The technique disclosed in Japanese Patent No. 5430370 increases the compression rate of the amount of data by extracting a differential using a complicated reference relation of log data. However, according to the conventional technique described above, the compression rate can be increased, but it is not possible to understand compressed data even if an analyst directly observes the compressed data in order to identify the problem portion, and decoding of the compressed data is necessary. Thus, the conventional technique has simply emphasized on improvement of the compression rate.

SUMMARY

It is an object of the present disclosure to at least partially solve the problems in the conventional technology.

To solve the above problem, and achieve the object, a log output device according to the present disclosure includes a storage unit that stores, in units of events, log data of a plurality of different events occurring during execution of an application, and, a log information output unit that outputs, as log recording information, differential data between log data of a newest event and log data of a latest event which is a same type of event as the newest event and which occurs temporally latest to the newest event and is stored in the storage unit.

The above and other objects, features, advantages and technical and industrial significance of this disclosure will be better understood by reading the following detailed description of presently preferred embodiments of the disclosure, when considered in connection with the accompanying drawings.

BRIEF DESCRIPTION OF THE DRAWINGS

FIG. 9 is a diagram illustrating a series of log data group and compressed data group of an event side by side;

FIG. 18 is a diagram illustrating a compressed data group saved in a file of the recording device and a restored log data group side by side.

DETAILED DESCRIPTION

Embodiments of the present disclosure will be described below in detail with reference to the drawings. It is to be noted that the present disclosure is not limited by this embodiment. In addition, the components in the following embodiments include those that are replaceable and easy for those skilled in the art, or those that are substantially identical.

First Embodiment

Figure 1:
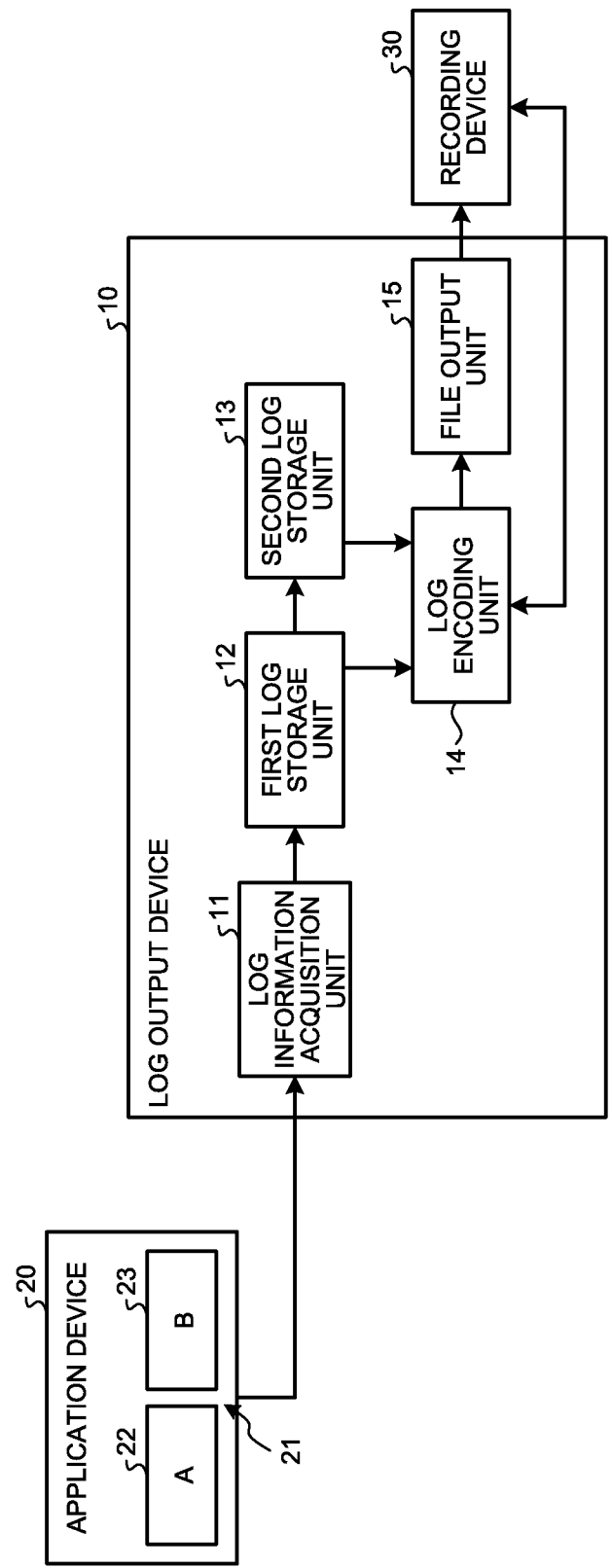
FIG. 1 is a block diagram illustrating a configuration of a log output device according to a first embodiment.
Figure 2:
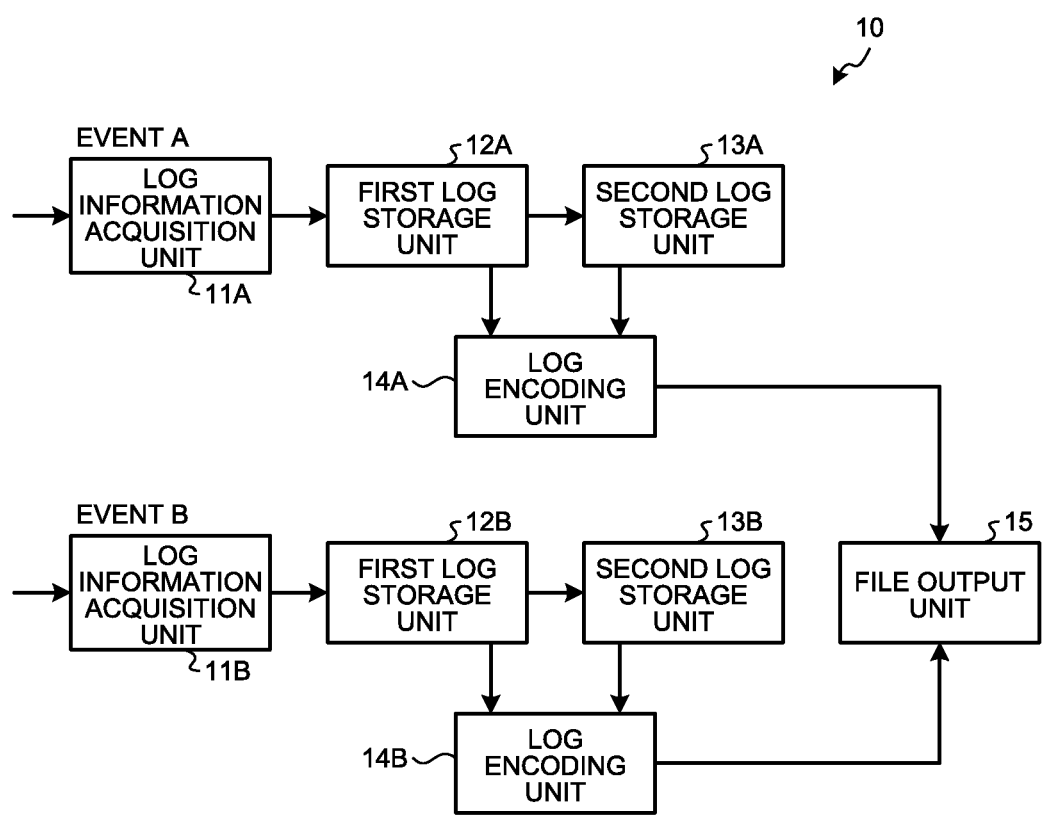
FIG. 2 is a block diagram illustrating the log output device provided in units of events.

FIG. 1 is a block diagram illustrating the configuration of a log output device according to the first embodiment. FIG. 2 is a block diagram illustrating the log output device provided in units of events. As illustrated in FIG. 1, an application device 20 and a recording device 30 are connected to a log output device 10. The application device 20 executes an application (program) for performing various functions of a computer and an electronic apparatus, for example. The application device 20 includes a control unit 21 for events that are executed (occur) sequentially during execution of an application.

The control unit 21 is configured to include a plurality of (e.g., two) buttons, i.e., an A button 22 and a B button 23 disposed on a graphical user interface (GUI), for example. The A button 22 and the B button 23 are control buttons for executing different events. In the present embodiment, an event A is executed when the user clicks the A button 22 disposed on the GUI, and an event B, which is different from the event A, is executed when the user clicks the B button 23. When these events A and B are executed, the application device 20 creates log data indicating a series of logs (control information, operation information, error information, and the like) related to the events A and B and outputs the log data to the log output device 10. It is to be noted that in the present embodiment, the number of buttons provided in the control unit 21 is two for convenience of explanation, but the present disclosure is not limited to this, and it is assumed that the number of events executed increases in accordance with the number of buttons. In addition, the control unit 21 for executing the event is not limited to the button disposed on the GUI.

The log output device 10 includes a log information acquisition unit 11, a first log storage unit 12, a second log storage unit 13, a log encoding unit (log information output unit) 14, and a file output unit 15. The log information acquisition unit 11 acquires a series of log data when a newest event (e.g., the newest executed event A) sequentially output from the application device 20 is executed, and stores the log data in the first log storage unit 12. The first log storage unit 12 stores log data of the newest event. The second log storage unit 13 stores a series of log data of a latest event which is the same type of event as the newest event stored in the first log storage unit 12 and which is executed temporally latest to the newest event. When a new newest event is input to the first log storage unit 12, the series of log data of the newest event stored in the first log storage unit 12 until then is input to and stored in the second log storage unit 13 as the log data of the latest event. At this time, the log data stored until then in the second log storage unit 13 is erased, and new input log data is stored in the second log storage unit 13 as the log data of the latest event.

The log encoding unit 14 outputs, as compressed data (log recording information), a differential (differential data) between the log data of the newest event stored in the first log storage unit 12 and the log data of the latest event stored in the second log storage unit 13. Here, in a case where the event is executed for the first time after the application is started, no log data is stored in the second log storage unit 13. Therefore, the log encoding unit 14 outputs, as compressed data, the log data of the newest event stored in the first log storage unit 12 as it is. The file output unit 15 adds the compressed data having been output from the log encoding unit 14 to the end of the same file.

In the present embodiment, the log output device 10 is a log output module incorporated into an application (program) including the above-described GUI. Therefore, each of the log information acquisition unit 11, the first log storage unit 12, the second log storage unit 13, the log encoding unit 14, and the file output unit 15, which are components of the log output device 10, is configured with a program (software), and a programmer incorporates them into the application as necessary when creating the application, for example. In addition, in the case where these components are implemented by a program, the program may be recorded in a computer-readable recording medium such as a CD-ROM, a flexible disk (FD), a CD-R, or a DVD in a file of an installable format or an executable format, and provided as a computer program product. In addition, the program may be configured so as to be stored on a computer connected to a network such as the Internet and provided by downloading it via the network.

In addition, the above-described log output device 10 is not limited to a program, and may be constituted by hardware such as a microprocessor or a microcomputer provided with, for example, a CPU, a RAM, and a ROM. Furthermore, a program (software) and hardware may be combined.

As described above, the present embodiment is configured so that two different (plurality of) events are executed. For this reason, the log output device 10 is mounted with two systems of modules in units of events as illustrated in FIG. 2. Therefore, the log data of the event A is input and compressed in the modules of a log information acquisition unit 11A, a first log storage unit 12A, a second log storage unit 13A, and a log encoding unit 14A. In addition, the log data of the event B is input and compressed in the modules of a log information acquisition unit 11B, a first log storage unit 12B, a second log storage unit 13B, and a log encoding unit 14B. The compressed data having been output from the log encoding units 14A and 14B of the respective events are recorded so as to be respectively added to the end of the same file, and recorded in the recording device 30 as one log file.

The recording device 30 is configured with a hard disk, for example. The recording device 30 includes a function of acquiring its own free space, and outputs the acquired free space to the log encoding unit 14. The log encoding unit 14 changes the way of taking the differential of log data in accordance with the free space of the recording device 30. It is to be noted that the log encoding unit 14 may include a function (free space acquisition unit) of acquiring a free space of the recording device 30.

Next, the operation of the log output device 10 according to the first embodiment will be described. For the log output device 10, an example of case in which the event A is executed is given. It is to be noted that the components of the log output device 10 are simply referred to as the log information acquisition unit 11, the first log storage unit 12, the second log storage unit 13, and the log encoding unit 14. FIGS. 3 to 6 are diagrams for explaining the operation of outputting compressed data from the differential between the log data of the newest event and the log data of the latest event. In FIGS. 3 to 6, each of log data 40-1 and 40-2 is configured to include a header label 41 and a log message column 42. The header label 41 indicates the type of the event of the log data and the order in which the event has been executed (has occurred), and, for example, an event A(1) indicates the first execution of the event A after the application is started. Then, an event A(2), an event A(3), . . . indicate the second and the third execution of the event A.

The log message column 42 is a collection of log messages that explain the contents of the log data having been output in execution of an event, and a log message described in each line indicates the operation content. The log message is a sentence that explains the operation content such as "func1 processing has started; A1", "Display processing has been successfully done; A2", and "OK processing has been successfully done; A3". In the present embodiment, the identical reference symbols A1, A2, . . . are given to messages indicating the identical operation contents.

Figure 3:
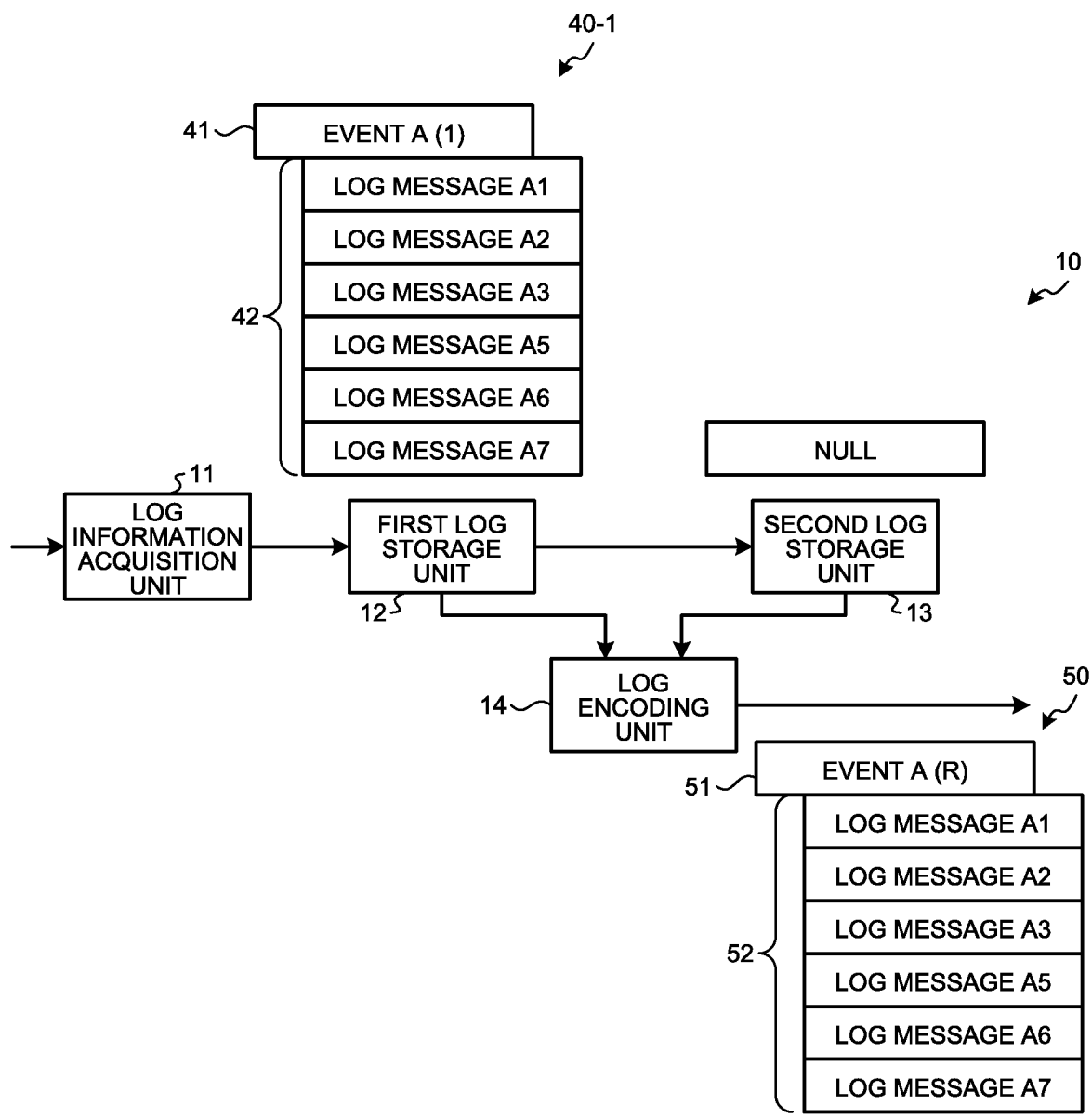
FIG. 3 is a diagram for explaining the operation of outputting compressed data from the differential between the log data of the newest event and the log data of the latest event.

When the event A is executed for the first time after the application is started, as illustrated in FIG. 3, the log data 40-1 of a newest event A having been output from the log information acquisition unit 11 is stored in the first log storage unit 12. At this point of time, no log data (latest log data 40-2) is stored in the second log storage unit 13 (NULL). Therefore, the log encoding unit 14 outputs, as compressed data 50, the log data 40-1 of the newest event A stored in the first log storage unit 12 as it is. Similarly to the log data, the compressed data 50 is configured to include a header label 51 and a log message column 52, and an event A(R) of the header label 51 indicates that the log data 40-1 of the newest event A has been output as it is (it is raw data).

Figure 4:
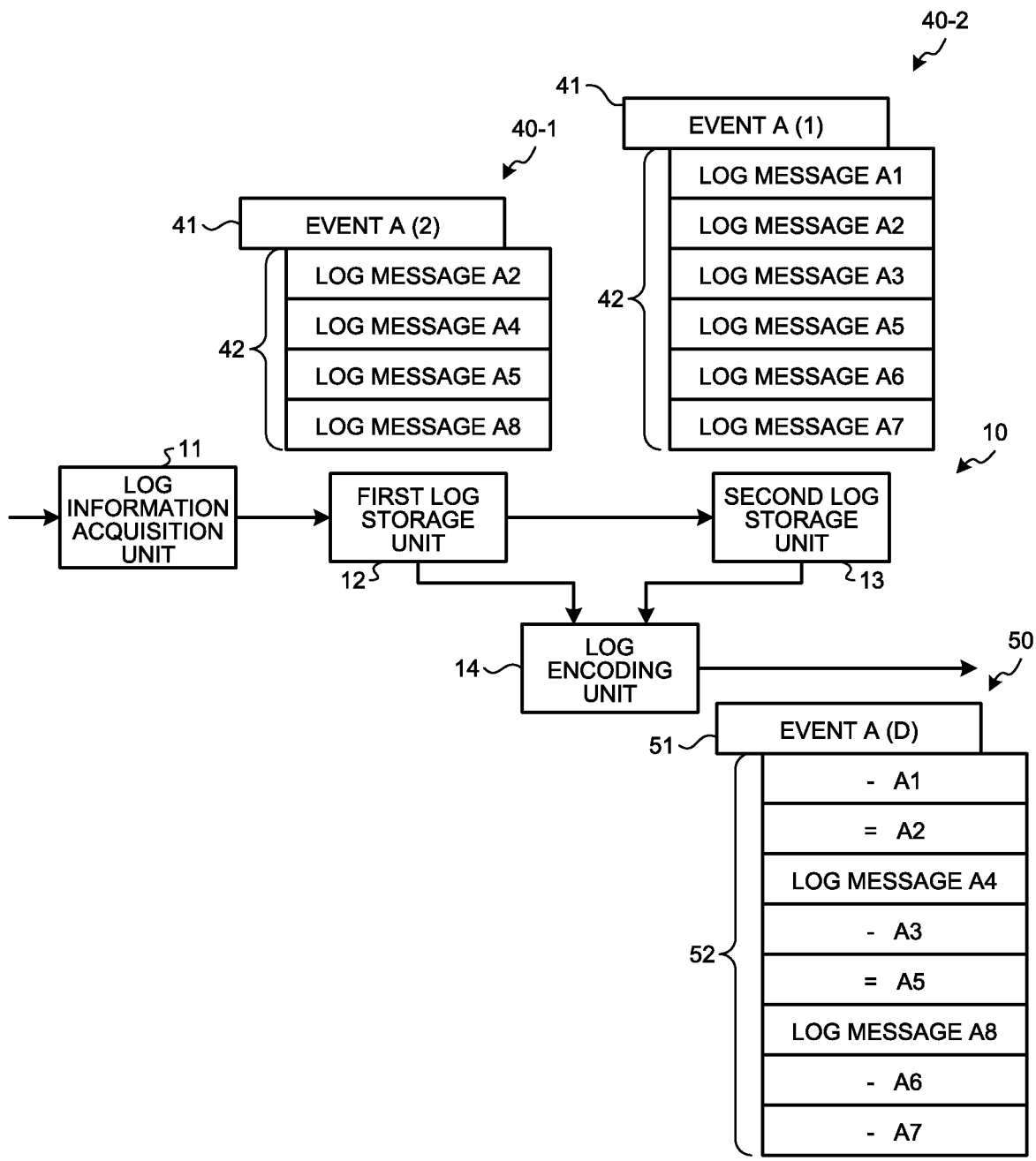
FIG. 4 is a diagram for explaining the operation of outputting compressed data from the differential between the log data of the newest event and the log data of the latest event.

After the compressed data 50 is output, the log data 40-1 of a new newest event A is input to the first log storage unit 12 as illustrated in FIG. 4, and hence the log data stored in the first log storage unit 12 until then is moved to the second log storage unit 13 as the log data 40-2 of the latest event and stored in the second log storage unit 13.

Figure 5:
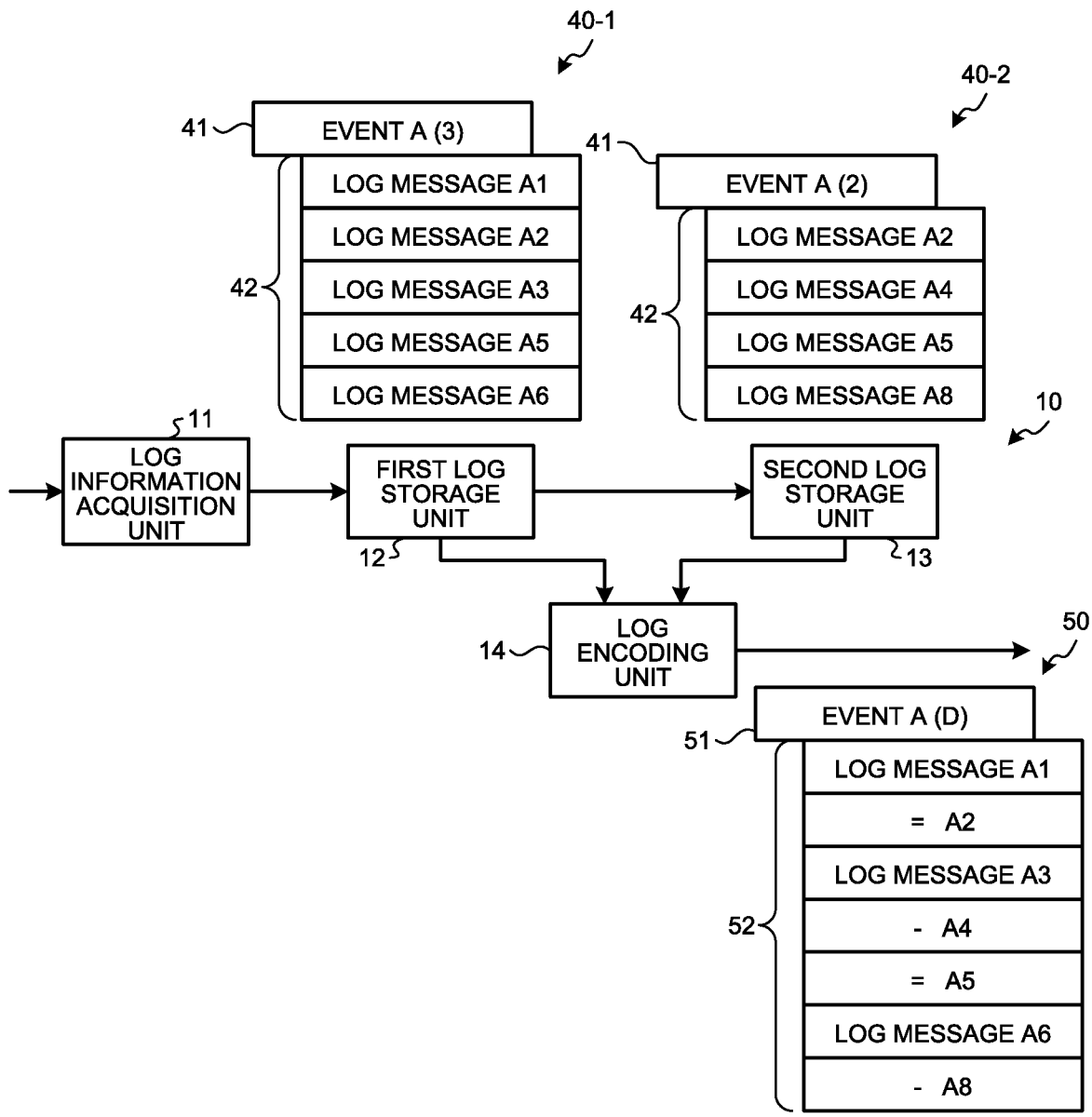
FIG. 5 is a diagram for explaining the operation of outputting compressed data from the differential between the log data of the newest event and the log data of the latest event.

The log encoding unit 14 takes a differential between the log data 40-1 of the newest event stored in the first log storage unit 12 and the log data 40-2 of the latest event stored in the second log storage unit 13, and outputs the differential as the compressed data 50. At the second or subsequent execution of the event A, the log data 40-2 of the latest event is stored in the second log storage unit 13. Therefore, the differential between the log data 40-1 of the newest event and the log data 40-2 of the latest event is acquired by comparing the log message of each log data in units of lines. Specifically, as illustrated in FIG. 4 and FIG. 5, the log message (e.g., log message A2) in the uppermost line for which encoding has not been processed is acquired from the log message column 42 of the log data 40-1. This log message is compared with the log message column 42 of the log data 40-2 in units of lines on a line-by-line basis from the uppermost line for which encoding has not been processed, and the comparison is performed until a line in which the log messages (row contents) match is found.

Here, in a case where a line matching the log message is found in the log message column 42 of the log data 40-2 of the latest event, the log encoding unit 14 outputs a predetermined matching sign "=" and a reference symbol (e.g., "A2") of the log message to this matching line. In a case where a line matching the log message is not found in the log message column 42 of the log data 40-2, the log encoding unit 14 determines that a new log message (e.g., log message A4) has been added, and outputs the log message as it is. Next, the log encoding unit 14 shifts to the second line of the log data 40-1 of the newest event, and performs the above-described differential acquisition operation down to the log message in the lowermost line.

In a case where a line matching the log message of the log data 40-1 of the newest event is found in the log message column 42 of the log data 40-2 of the latest event, the log encoding unit 14 determines that an unmatched line has been deleted in the log data 40-1 of the newest event by the time the matching line has been found. Then, the log encoding unit 14 outputs a predetermined sign "−" and the reference symbol of the log message (e.g., "A1") to the deleted line.

As described above, the log encoding unit 14 takes the differential between the log data 40-1 of the newest event and the log data 40-2 of the latest event, and outputs the differential as the compressed data 50. In the header label 51 of the compressed data 50 in this case, an event A(D) is described. This indicates that differential data has been output in the compressed data 50.

Figure 6:
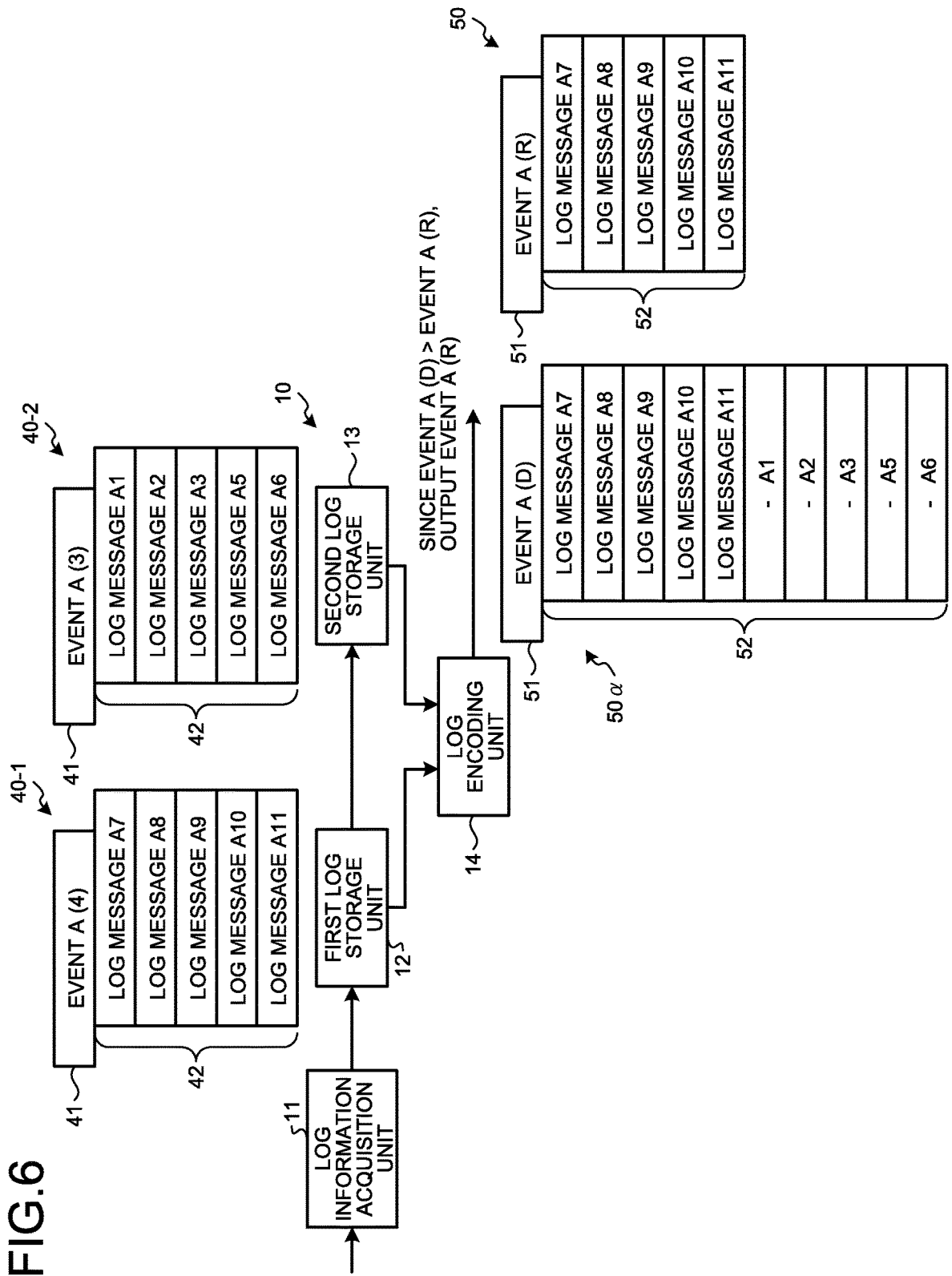
FIG. 6 is a diagram for explaining the operation of outputting compressed data from the differential between the log data of the newest event and the log data of the latest event.

In addition, it is also assumed as illustrated in FIG. 6 that the contents of the log message are totally different when the log data 40-1 of the newest event is compared with the log data 40-2 of the latest event. In this case, differential data 50α between the log data 40-1 and the log data 40-2 can be acquired, but the differential data 50α sometimes becomes larger in amount of data than the log data 40-1 of the newest event. Therefore, the log encoding unit 14 compares the size of the amount of data of the differential data 50α with that of the log data 40-1 of the newest event, and outputs the one with the smaller amount of data as compressed data. In the example of FIG. 6, since the log data 40-1 is smaller in amount of data than the differential data 50α, the log data 40-1 is output as it is (raw data).

Figure 7:
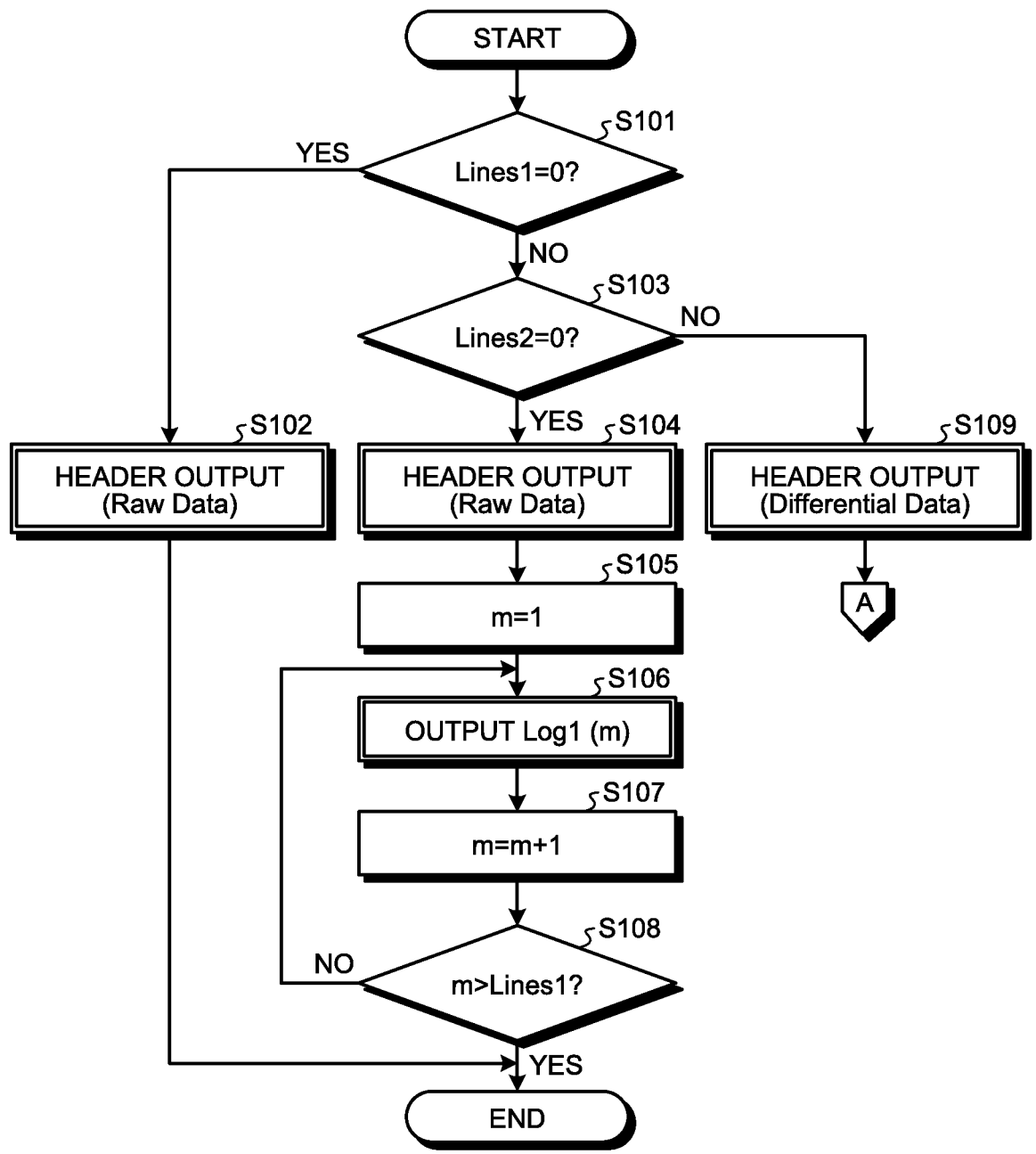
FIG. 7 is a flowchart illustrating a procedure of encoding processing of log data.
Figure 8:
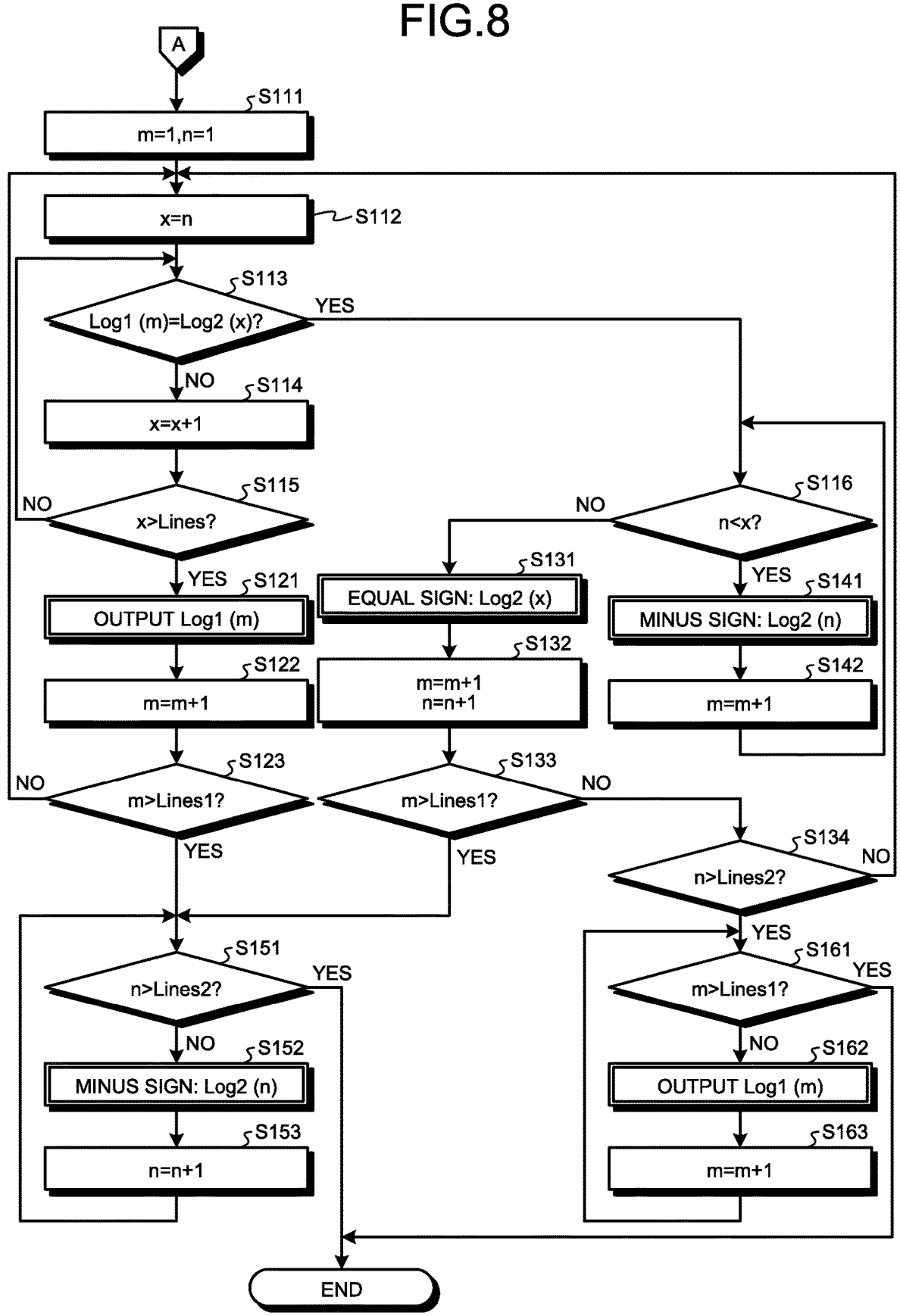
FIG. 8 is a flowchart illustrating a procedure of encoding processing of log data.

Next, an encoding processing operation of the log encoding unit 14 will be described. FIGS. 7 and 8 are flowcharts illustrating the procedure of the encoding processing of log data. This encoding processing is started after a series of processing of one event (e.g., event A) ends and the entire log message column 42 comes up in the first log storage unit 12.

In a Case where Event does not Output Log

First, as shown in the flowchart of FIG. 7, the log encoding unit 14 checks the number of lines (Lines1) of the log message column 42 stored in the first log storage unit 12 (step S101). If Lines1 is 0 lines (NULL) (step S101; Yes), the log encoding unit 14 outputs, to the file output unit 15, the header label 51 in which (R) indicating that the log message column 42 stored in the first log storage unit 12 is output as it is as the compressed data 50 is added to the event name (step S102). However, since the number of lines in Lines1 is 0 and the log message column 42 does not exist, the log encoding unit 14 outputs only the header label 51 and the processing ends.

In a Case of Outputting Log of Event as it is

On the other hand, if Lines1 is not 0 lines (step S101; No), the log encoding unit 14 checks the number of lines (Lines2) of the log message column 42 stored in the second log storage unit 13 (Step S103). If Lines2 is 0 (NULL) in this step S103 (step S103; Yes), the log encoding unit 14 outputs, to the file output unit 15, the header label 51 in which (R) indicating that the log message column 42 stored in the first log storage unit 12 is output as it is as the compressed data 50 is added to the event name (step S104).

Subsequently, the log encoding unit 14 sets 1 to a variable m indicating the line position of the log message column 42 stored in the first log storage unit 12 (step S105). Furthermore, the log encoding unit 14 outputs a log message (Log1(m)) in the m-th line of the log message column 42 (step S106). The log encoding unit 14 sequentially adds 1 to the value of the variable m (step S107). If the variable m is not larger than the number of lines of Lines1 (step S108; No), the processing returns to step S106 until it becomes larger, and the log encoding unit 14 outputs the log message of the first log storage unit 12 to the file output unit 15 line by line. If the variable m is larger than the number of lines in Lines1 (step S108; Yes), all the log messages stored in the first log storage unit 12 are output, and thus the processing ends. The processing so far corresponds to the case of FIG. 3 described above.

In a Case of Outputting Log Differential Data Between Events

In addition, if Lines2 is not 0 lines in step S103 (step S103; No), the log encoding unit 14 outputs, to the file output unit 15, the header label 51 in which (D) indicating that the differential data between the first log storage unit 12 and the second log storage unit 13 has been output is added to the event name (step S109). Thereafter, the processing proceeds to the processing of generating differential data illustrated in FIG. 8.

The encoding processing illustrated in FIG. 8 is processing of encoding (outputting differential data) how the log message column 42 of the log data 40-2 stored in the second log storage unit 13 changes to become the log message column 42 of the first log storage unit 12. In the present embodiment, the change of the message column 42 is converted into a sign, and it is expressed by the minus sign (−) if the log message existing in the second log storage unit 13 does not appear in the first log storage unit 12, and it is expressed by the equal sign (=) if the same log message appears. However, a log message newly appearing in the first log storage unit 12 is output not as a sign but as a log message as it is.

The mechanism of reducing (compressing) the amount of data by encoding of the present disclosure is based on that the same event has a high probability of outputting the same log message column each time it is executed. However, since the amount of data is not necessarily reduced, it is not illustrated in the flowchart but as illustrated in FIG. 6, it is configured that the log encoding unit 14 outputs the log message column with the smaller amount of data, for the log message column per event, after comparing the amount of data when encoded with the amount of data when not encoded, whereby it is guaranteed that the amount of data can always be reduced as compared with that of the original log message column. If the amount of data not encoded is smaller, the encoded data is not output, and the header label 51 in which (R) indicating that the log message column 42 of the first log storage unit 12 is output as it is as the compressed data 50 is added to the event name, and the log message column 42 of the first log storage unit 12 are output to the file output unit 15.

Search Matching Log Messages Between Events

In the processing of FIG. 8, first, the log encoding unit 14 sets 1 to the variable m indicating the line position of the log message column 42 stored in the first log storage unit 12, and similarly sets 1 to a variable n indicating the line number of the second log storage unit 13 (step S111). In addition, the log encoding unit 14 substitutes the value of the variable n into a variable x for searching the log message column 42 of the second log storage unit 13 (step S112).

Next, the log encoding unit 14 compares a log message (Log1(m)) in the m-th line of the log message column 42 of the first log storage unit 12 with a log message (Log2(x)) in the x-th line of the log message column 42 of the second log storage unit 13, and determines whether the messages match (step S113). Here, if the log message (Log1(m)) and the log message (Log2(x)) do not match (step S113; No), 1 is added to the variable x (step S114). Furthermore, the log encoding unit 14 checks whether the variable x is larger than the number of lines (Lines2) of the log message column 42 of the second log storage unit 13 (step S115). If the variable x is equal to or smaller than Lines2 (step S115; No), the processing returns to step S113 to configure a loop for searching the log message of the second log storage unit 13 that matches the log message of the first log storage unit 12.

Processing of Newly Appearing Log Message in Subsequent Event

On the other hand, if the variable x is larger than Lines2 (step S115; Yes), a matching log message is not found, i.e., Log1(m) is a newly appearing log message, and hence the log encoding unit 14 outputs Log1(m) (step S121).

Next, the log encoding unit 14 adds 1 to the variable m (step S122), and determines whether the variable m is larger than the number of lines (Lines1) of the log message column 42 of the first log storage unit 12 (step S123). If the variable m is equal to or smaller than Lines1 (step S123; No), the processing returns to step S112, and the log message in the next line of the log message column 42 of the first log storage unit 12 is searched. If the variable m is larger than Lines1 (step S123; Yes), it is determined that all the lines of the log message column 42 of the first log storage unit 12 have been searched, and the processing proceeds to step S151. The processing of steps S151 to S153 will be described later.

Processing of Log Message of Previous Event that has not Appeared in Subsequent Event On the other hand, if in the processing of step S113, the log message (Log1(m)) and the log message (Log2(x)) match (step S113; Yes), the processing proceeds to step S116. In this step S116, it is checked whether the variable x indicating the line of the log message column 42 of the second log storage unit 13 when the log message matched in step S113 is larger than the variable n indicating the line in which the search is started.

If the variable x is larger than the variable n (step S116; Yes), in order to indicate that there has been an unmatched log message by the time the matched log message is found, the log encoding unit 14 treats the unmatched log message as a log message that has not appeared in the first log storage unit 12, and outputs the minus sign (−) (step S141). Next, after adding 1 to the variable n (step S141), the processing returns to step S116 to configure a loop for processing the log message that has not appeared in the first log storage unit 12.

Processing of Log Message Appearing in Both Subsequent Event and Previous Event

If the variable n is equal to or larger than the variable x (step S116; No), the Log2(x) of the second log storage unit 13 is determined to have appeared also in the log message column of the first log storage unit 12, and the log encoding unit 14 outputs the equal sign (=) (step S131). At this time, a value by which Log2(x) is symbolized may be added after the equal sign (=). For example, "A2", which is a part of "log message A2" of the log message column 42 of the second log storage unit 13 in FIG. 4, may be added so as to make it as "=A2" of the log message column 52.

Next, the log encoding unit 14 adds 1 to each of the variable m and the variable n (step S132), and checks whether the variable m is larger than Lines1 (step S133). If the variable m is larger than Lines1 (step S133; Yes), i.e., if all the log message columns in the first log storage unit 12 have been processed, the processing proceeds to step S151.

Encoding Processing of Next Log Message

In addition, if the variable m is equal to or smaller than Lines1 (step S133; No), there is an unprocessed log message in the log message column of the first log storage unit 12, and it is hence checked whether the variable n is larger than Lines2 (step S134). If the variable n is equal to or smaller than Lines2 (step S134; No), i.e., if there is an unprocessed log message in both the first log storage unit 12 and the second log storage unit 13, the processing returns to step S112, and encoding processing of the next unprocessed log message is performed.

In a Case where Processing of Log Message of Previous Event has been Done

On the other hand, if the variable n is larger than Lines2 (step S134; Yes), it is checked whether the variable m is larger than Lines1 (step S161). If the variable m is equal to or smaller than Lines1 (step S161; No), i.e., if an unprocessed log message remains in the first log storage unit 12, the log encoding unit 14 outputs Log1(m) because the unprocessed log message is a newly appearing log message as in step S121 (step S162). Next, after the log encoding unit 14 adds 1 to the variable m (step S163), the processing returns to step S161 to configure a loop for processing the unprocessed log message. In addition, if the variable m is larger than Lines1 (step S161; Yes), all the processing is completed, and thus the encoding processing ends.

In a Case where Processing of Log Message of Subsequent Event has been Done

In step S151 described above, it is checked whether the variable n is larger than Lines2. If the variable n is equal to or smaller than Lines2 (step S151; No), an unprocessed line remains in the log message column 42 of the second log storage unit 13. Since this unprocessed line is a log message that has not appeared in the first log storage unit 12, the log encoding unit 14 outputs the minus sign (–) (step S152). At this time, a value by which Log2(n) is symbolized may be added after the minus sign. For example, "A6", which is a part of "log message A6" of the log message column 42 of the second log storage unit 13 in FIG. 4, may be added so as to make it as "–A6" of the log message column 52.

Next, after 1 is added to the variable n (step S153), the processing returns to step S151 to configure a loop for processing the unprocessed log message. In step S151, if the variable n is larger than Lines2 (step S151; Yes), all the processing is completed, and thus the encoding processing ends. The processing so far corresponds to the case of FIGS. 4 and 5 described above.

FIG. 9 is a diagram illustrating a series of log data group and compressed data group of an event side by side. A series of log data group 60 of the event A is log data generated by execution of the event A and arranged in the order of execution. On the other hand, a compressed data group 70 of the event A is compressed data compressed by the log output device 10 and arranged in the order of execution of the event. In the present embodiment, the log output device 10 takes the differential between the log data 40-1 of the newest event stored in the first log storage unit 12 and the log data 40-2 of the latest event stored in the second log storage unit 13 and sequentially outputs the differential as the compressed data 50. Therefore, it is possible to make the amount of data of the compressed data 50 smaller than the log data.

In addition, in a case where the log data 40-1 of the newest event and the log data 40-2 of the latest event include an identical log message, the log encoding unit 14 outputs a predetermined matching sign "=" (equal sign) and a reference symbol (e.g., "A1") of the log message to a line corresponding to the log message. Furthermore, in a case where the log message included in the log data 40-2 of the latest event has been deleted from the log data 40-1 of the newest event, the log encoding unit 14 outputs a predetermined sign "–" (minus sign) and a reference symbol (e.g., "A1") of the log message to the deleted line. Therefore, the amount of data of the compressed data 50 can be reduced, and the contents of the line indicated by the sign can be read from the preceding and subsequent compressed data 50. Furthermore, since the newly appearing log message is output as it is, the problem portion can be identified by observing the compressed data group 70 without decoding the changed portion from the previous event.

Variation

In the embodiment described above, the compressed data 50, which is made up of the differential data between the log data 40-1 of the newest event and the log data 40-2 of the latest event, indicates the added log messages with sentence information such as "func1 processing has started; A1", "Display processing has been successfully done; A2", and "OK processing has been successfully done; A3". The log message indicated in the sentence information is easy to understand the content, but the amount of data tends to increase due to an increase in the number of characters.

Therefore, in the present variation, the log encoding unit 14 can output the log message of the compressed data 50 by switching the log message to sentence information, word information, or character information in accordance with the free space of the recording device 30 in which the compressed data 50 is recorded.

Specifically, if the free space of the recording device 30 is equal to or larger than 50%, the log encoding unit 14 outputs the log message of the compressed data 50 as sentence information as described above. The log encoding unit 14 acquires the free space of the recording device 30. In addition, when the free space of the recording device 30 falls below a first threshold value (e.g., 50%), the log encoding unit 14 indicates the log message of the compressed data 50 as word information. For example, "func1 processing has started; A1" is indicated by word information such as "func1 start; A1", "Display processing has been successfully done; A2" as "Display successful; A2", and "OK processing has been successfully done; A3" as "OK successful; A3". In this case, similar character strings are not output. This makes it possible to reduce the amount of data while retaining the contents of the log data.

In addition, when the free space of the recording device 30 falls below a second threshold value (e.g., 10%) lower than the first threshold value, the log encoding unit 14 further reduces the data by indicating the log message of the compressed data 50 as character information. In this case, only character information (reference symbol of the log message) is indicated, such as "func1 start; A1" as "A1", "Display successful; A2" as "A2", and "OK successful; A3" as "A3". In this case, although it is considered that the content of a log message cannot be understood simply by character information (reference symbol of the log message), the free space of the recording device 30 does never fall below the second threshold value suddenly and the log message having the identical reference symbol is displayed in the preceding stage, and hence the content of the log data can be confirmed even when the log message is displayed as the character information. It is to be noted that the first threshold value and the second threshold value described above are examples and can be changed as appropriate.

Second Embodiment

Figure 10:
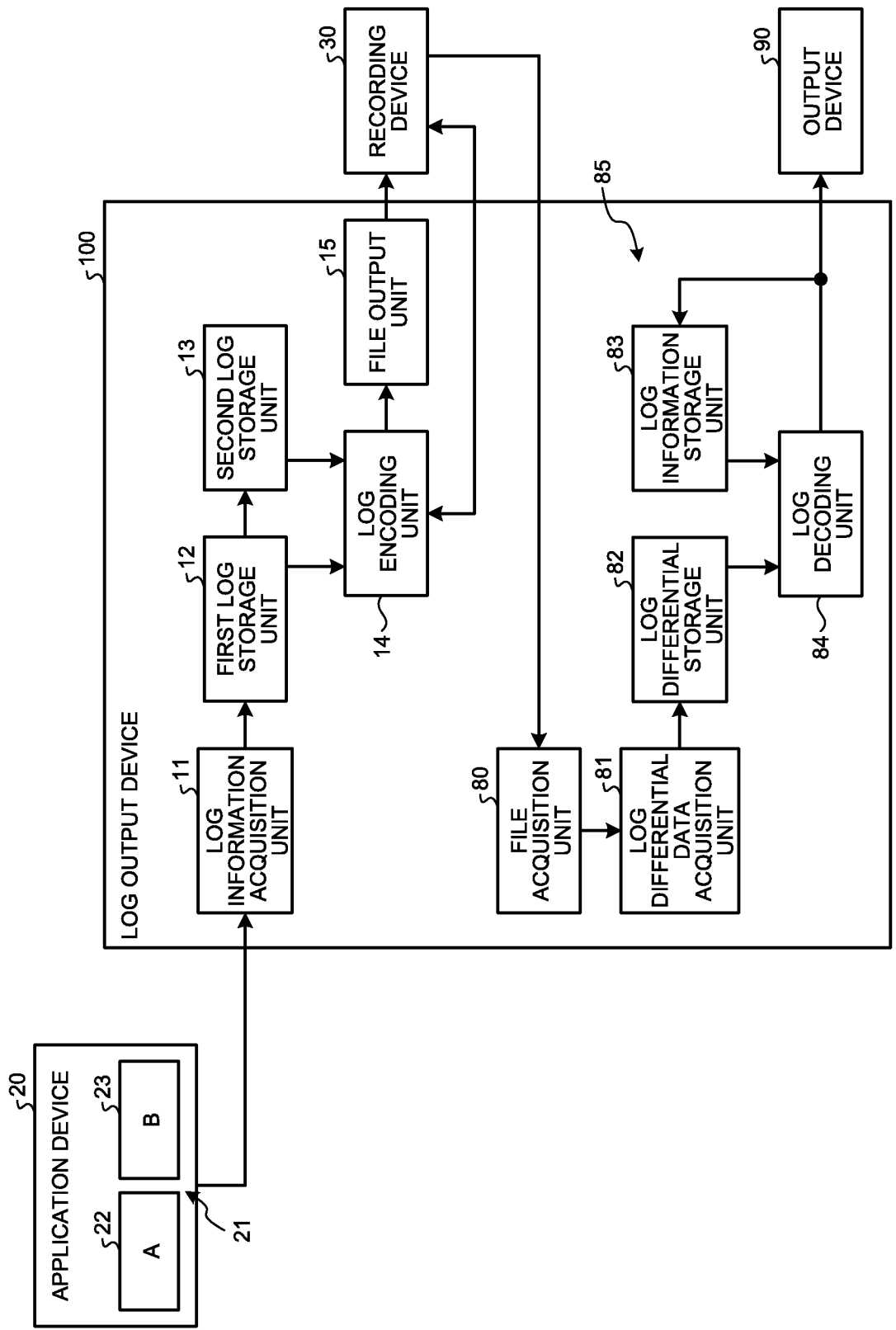
FIG. 10 is a block diagram illustrating a configuration of a log output device according to a second embodiment.
Figure 11:
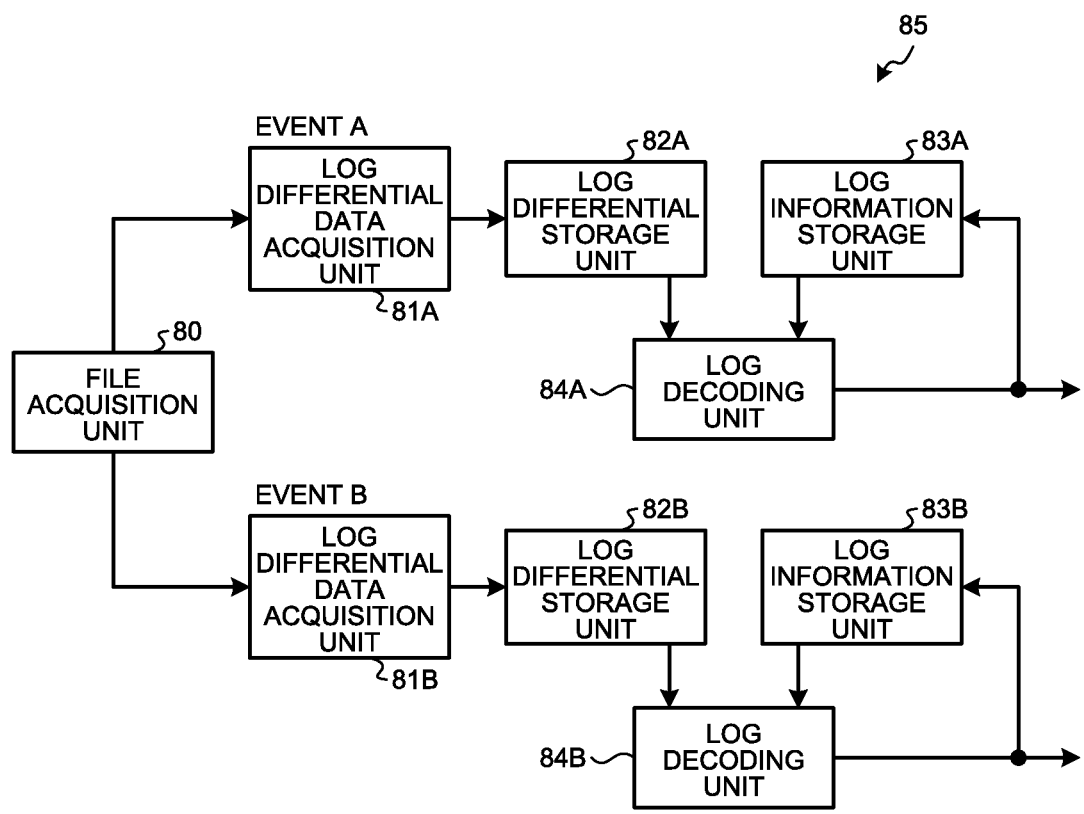
FIG. 11 is a block diagram illustrating a log restoration unit provided in units of events.

FIG. 10 is a block diagram illustrating the configuration of a log output device according to the second embodiment. FIG. 11 is a block diagram illustrating a log restoration unit provided in units of events. While the log output device 10 according to the first embodiment is configured to sequentially output differential data between the log data of the newest event and the log data of the latest event to the recording device 30 as the compressed data 50, the log output device 10 according to the second embodiment further includes a log restoration unit 85 for restoring the compressed data 50 stored in the recording device 30 into log data. Identical components to those of the first embodiment are given the identical reference symbols, and description thereof will be omitted.

As illustrated in FIG. 10, an output device 90 is connected to a log output device 100 in addition to the application device 20 and the recording device 30 described above. The output device 90 outputs log data restored (decoded) by the log restoration unit 85 described later, and includes, for example, a display device of a computer and a printer. In addition, the output device 90 may output data to and record in a recording device different from the recording device 30.

The log output device 100 includes the log restoration unit 85 that restores the compressed data 50 to log data. The log restoration unit 85 includes a file acquisition unit 80, a log differential data acquisition unit 81, a log differential storage unit 82, a log information storage unit 83, and a log decoding unit (log data output unit) 84. The file acquisition unit 80 acquires a log file recorded in the recording device 30. The log differential data acquisition unit 81 sequentially acquires compressed data (log recording information) from a log file. This compressed data is differential data between log data of a previous event executed earlier temporally and log data of a subsequent event which is the same as this previous event and is executed after (next to) the event. The log differential storage unit 82 stores compressed data acquired by the log differential data acquisition unit 81. The log information storage unit 83 stores the log data of the previous event restored by the log decoding unit 84. The log decoding unit 84 restores the log data of the subsequent event from the log data of the previous event stored in the log information storage unit 83 and the compressed data stored in the log differential storage unit 82.

Also in the present embodiment, the log output device 100 is a log output module incorporated into an application (program) including the above-described GUI. Therefore, the file acquisition unit 80, the log differential data acquisition unit 81, the log differential storage unit 82, the log information storage unit 83, and the log decoding unit 84 that constitute the log restoration unit 85 are configured by a program (software) in the same manner as the log information acquisition unit 11, the first log storage unit 12, the second log storage unit 13, the log encoding unit 14, and the file output unit 15. In addition, the log output device 100 is not limited to a program, and may be constituted by hardware such as a microprocessor or a microcomputer in the same manner as the log output device 10. Furthermore, a program (software) and hardware may be combined.

As illustrated in FIG. 11, the log restoration unit 85 is implemented with two systems of modules in units of events. Therefore, the log file acquired by the file acquisition unit 80 is divided into two systems, where a log differential data acquisition unit 81A, a log differential storage unit 82A, a log information storage unit 83A, and a log decoding unit 84A execute restoration processing of the log file of the event A, and a log differential data acquisition unit 81B, a log differential storage unit 82B, a log information storage unit 83B, and a log decoding unit 84B execute restoration processing of the log file of the event B.

Next, the operation of the log restoration unit 85 of the log output device 100 according to the second embodiment will be described. For this log restoration unit 85, an example of case of restoring the log file of the event A is given, and the components of the log restoration unit 85 are simply referred to as the log differential data acquisition unit 81, the log differential storage unit 82, the log information storage unit 83, and the log decoding unit 84. FIGS. 12 to 15 are diagrams for explaining the operation of restoring the log data of a subsequent event from the log data and compressed data of a previous event. In those FIGS. 12 to 15, compressed data 110 is configured to include a header label 111 and a log differential message column 112. The header label 111 indicates the type of event of the compressed data 110.

In addition, the header label 111 indicates whether the compressed data 110 is log data as it is (raw data) or differential data. That is, the event A(R) of the header label 111 indicates that the log data of the event A has been output as it is (it is raw data), and the event A(D) indicates that it is differential data between the log data of a previous event A executed earlier temporally and the log data of a subsequent event A executed immediately after the event temporally.

Figure 12:
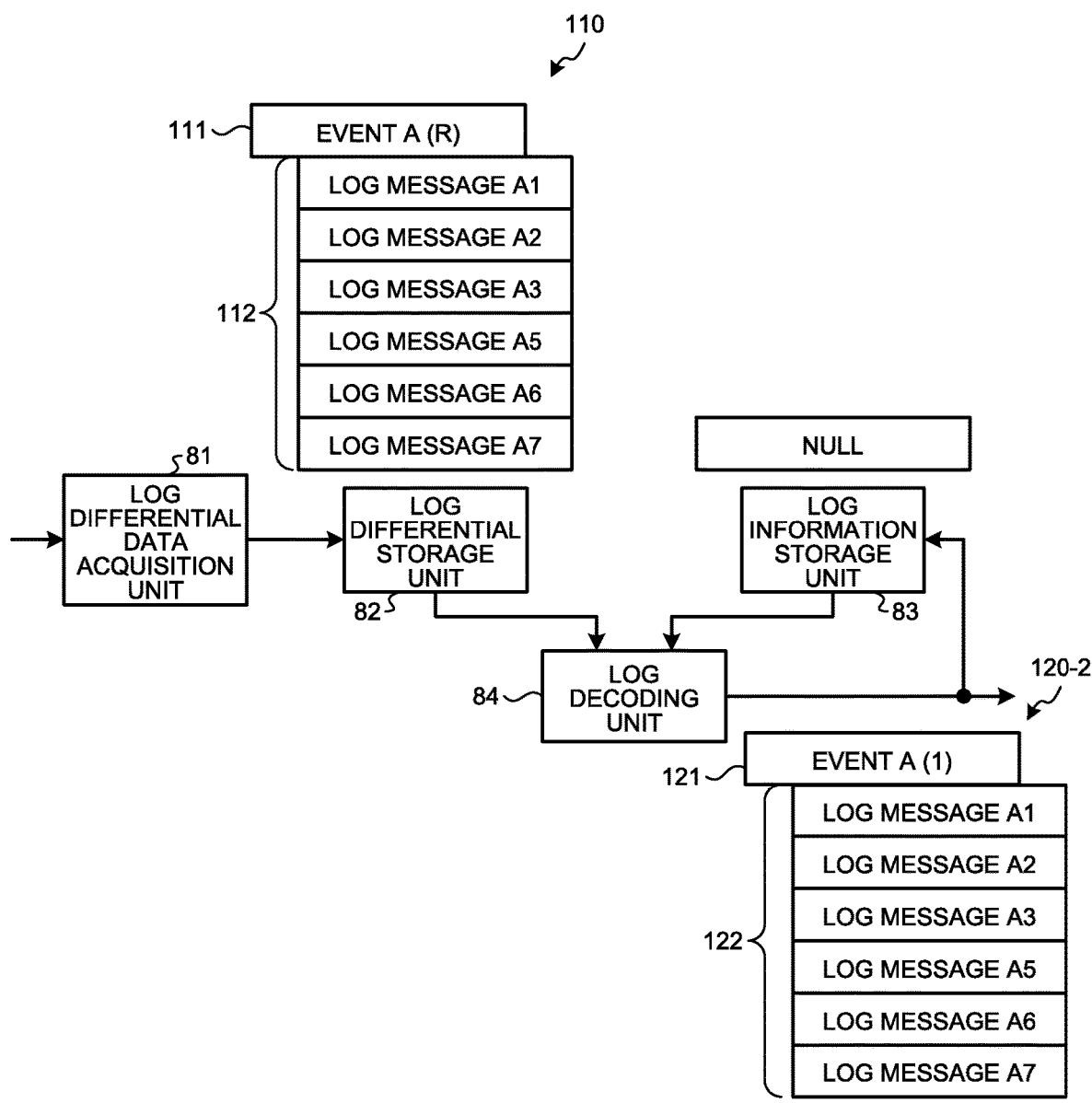
FIG. 12 is a diagram for explaining the operation of restoring the log data of a subsequent event from the log data and compressed data of a previous event.

In a case where the compressed data of the event A is first acquired, as illustrated in FIG. 12, the compressed data 110 having been output from the log differential data acquisition unit 81 is stored in the log differential storage unit 82. At this point of time, log data (log data 120-1 of the previous event) is not stored in the log information storage unit 83 (NULL). Since the compressed data 110 acquired first is log data (raw data), the log decoding unit 84 outputs the compressed data 110 stored in the log differential storage unit 82 as it is as log data 120-2 of the subsequent event. Thereafter, as illustrated in FIG. 13, the log decoding unit 84 stores the compressed data 110 in the log information storage unit 83 as the log data 120-1 of the previous event.

Figure 13:
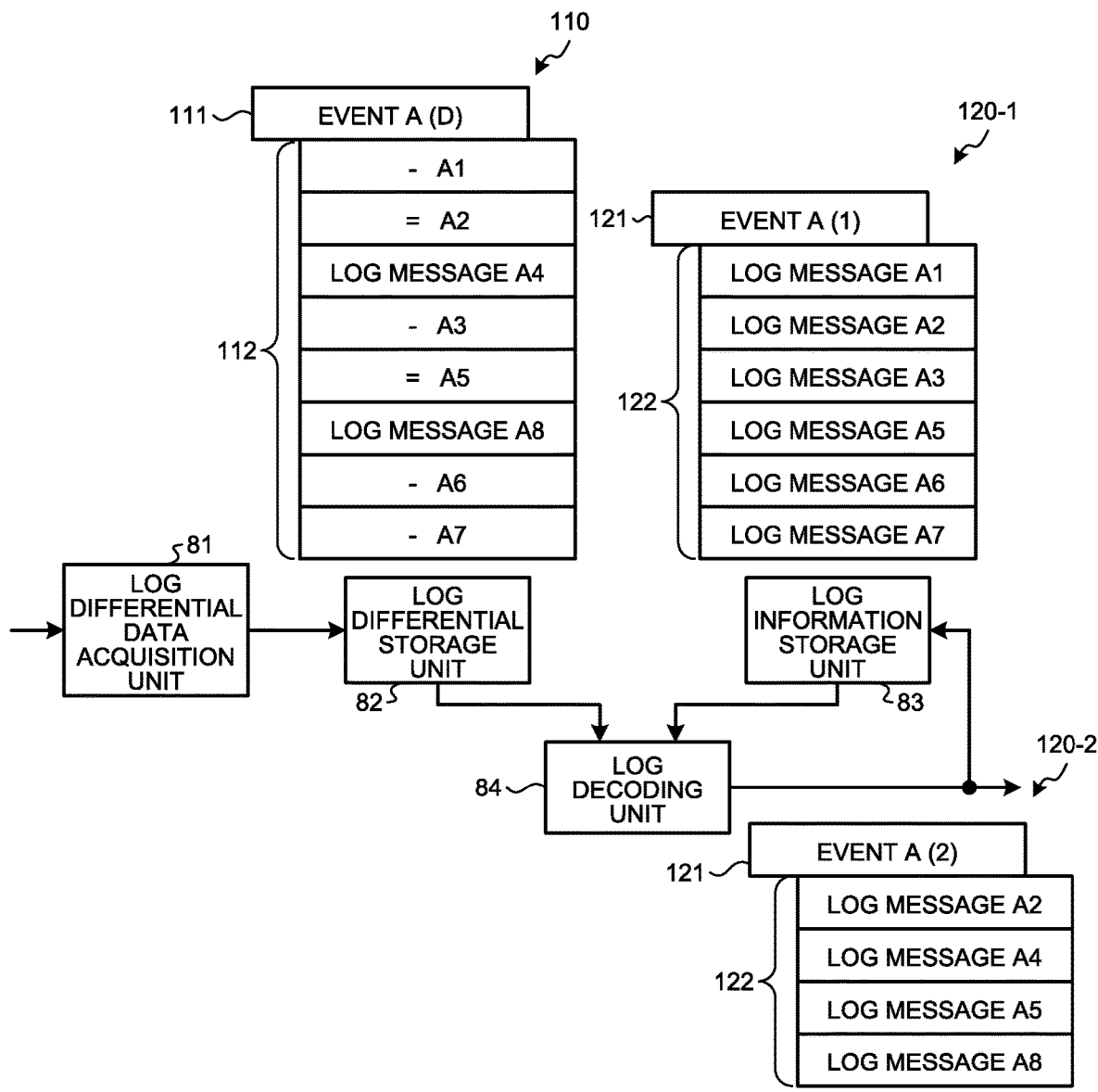
FIG. 13 is a diagram for explaining the operation of restoring the log data of a subsequent event from the log data and compressed data of a previous event.
Figure 14:
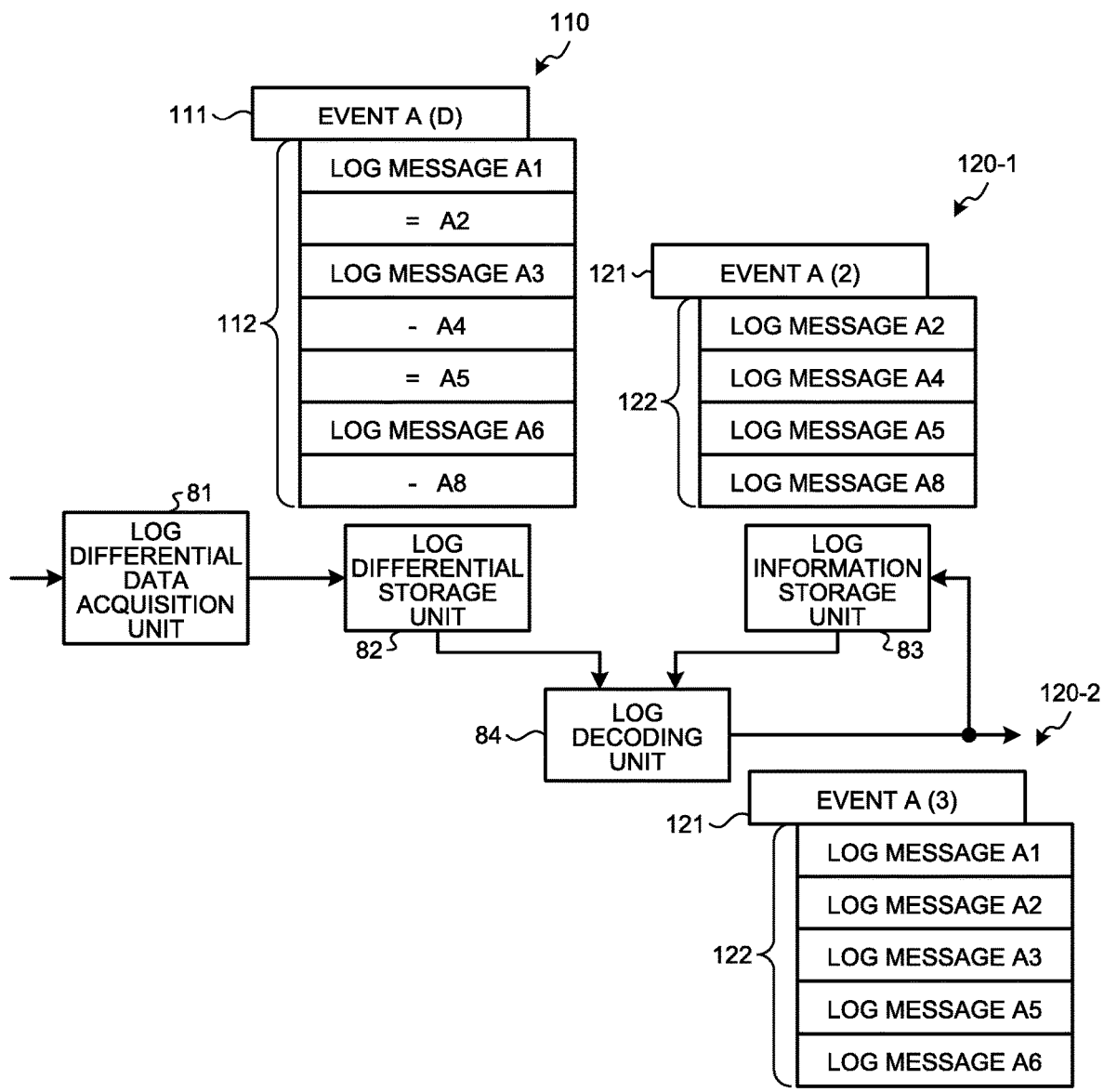
FIG. 14 is a diagram for explaining the operation of restoring the log data of a subsequent event from the log data and compressed data of a previous event.

After outputting the log data 120-2 of the subsequent event, the next compressed data 110 is input to the log differential storage unit 82 as illustrated in FIGS. 13 and 14. Therefore, the log decoding unit 84 restores the compressed data 110 of the log differential storage unit 82 having been newly input and the log data 120-1 of the previous event stored in the log information storage unit 83 by unifying (merging), and outputs the restored data as the log data 120-2 of the subsequent event. Then, this restored log data is moved to the log information storage unit 83, and stored in the log information storage unit 83 as the log data 120-1 of the previous event.

Figure 15:
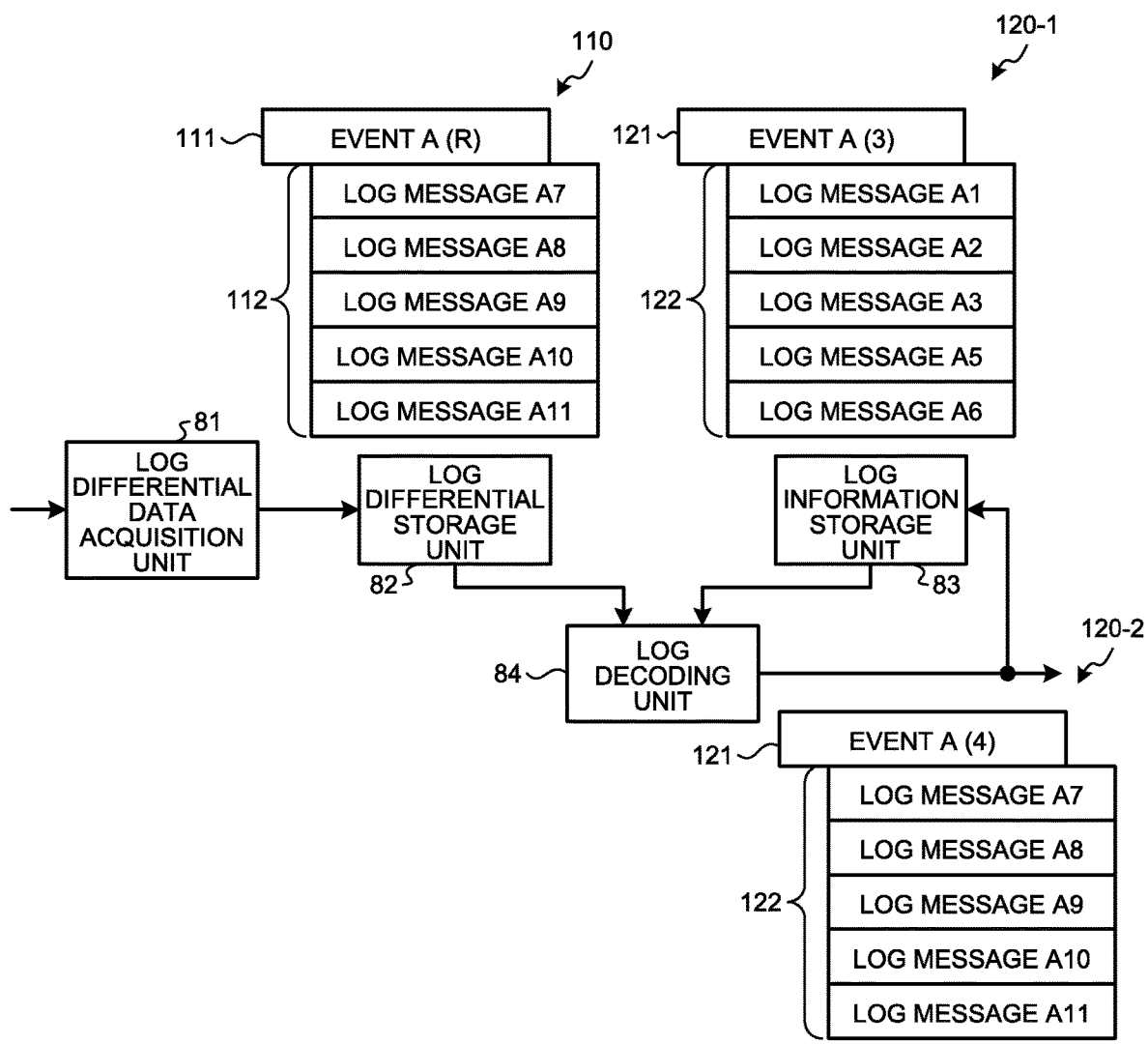
FIG. 15 is a diagram for explaining the operation of restoring the log data of a subsequent event from the log data and compressed data of a previous event.

In addition, depending on the size of the amount of data, log data (raw data) may be output as it is as compressed data when it is compressed (encoded). Therefore, as illustrated in FIG. 15, the log decoding unit 84 monitors the header label 111 of the compressed data 110 having been input to the log differential storage unit 82. If it is log data (raw data), the log decoding unit 84 outputs this log data (raw data) as it is as the log data 120-2 of the subsequent event.

Figure 16:
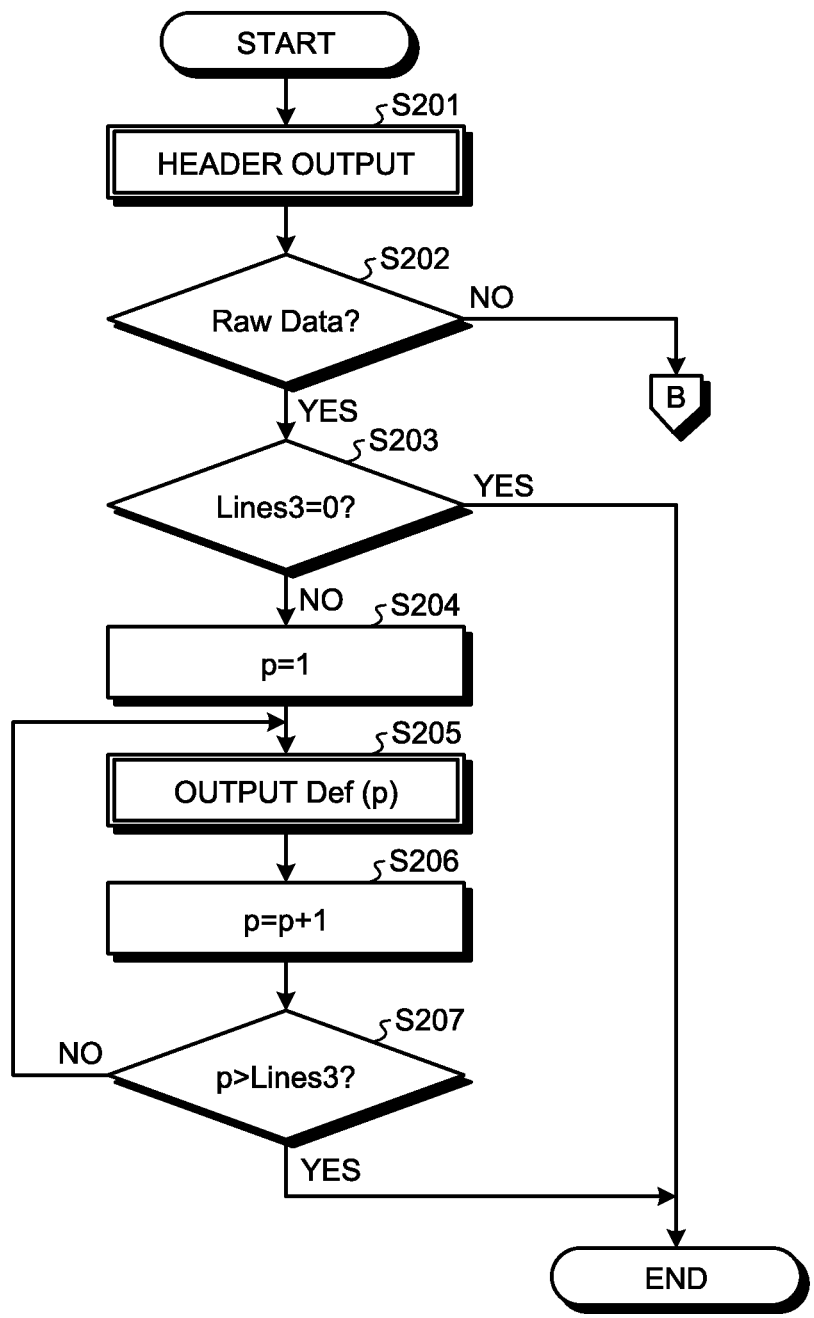
FIG. 16 is a flowchart illustrating a procedure of decoding processing of log data.
Figure 17:
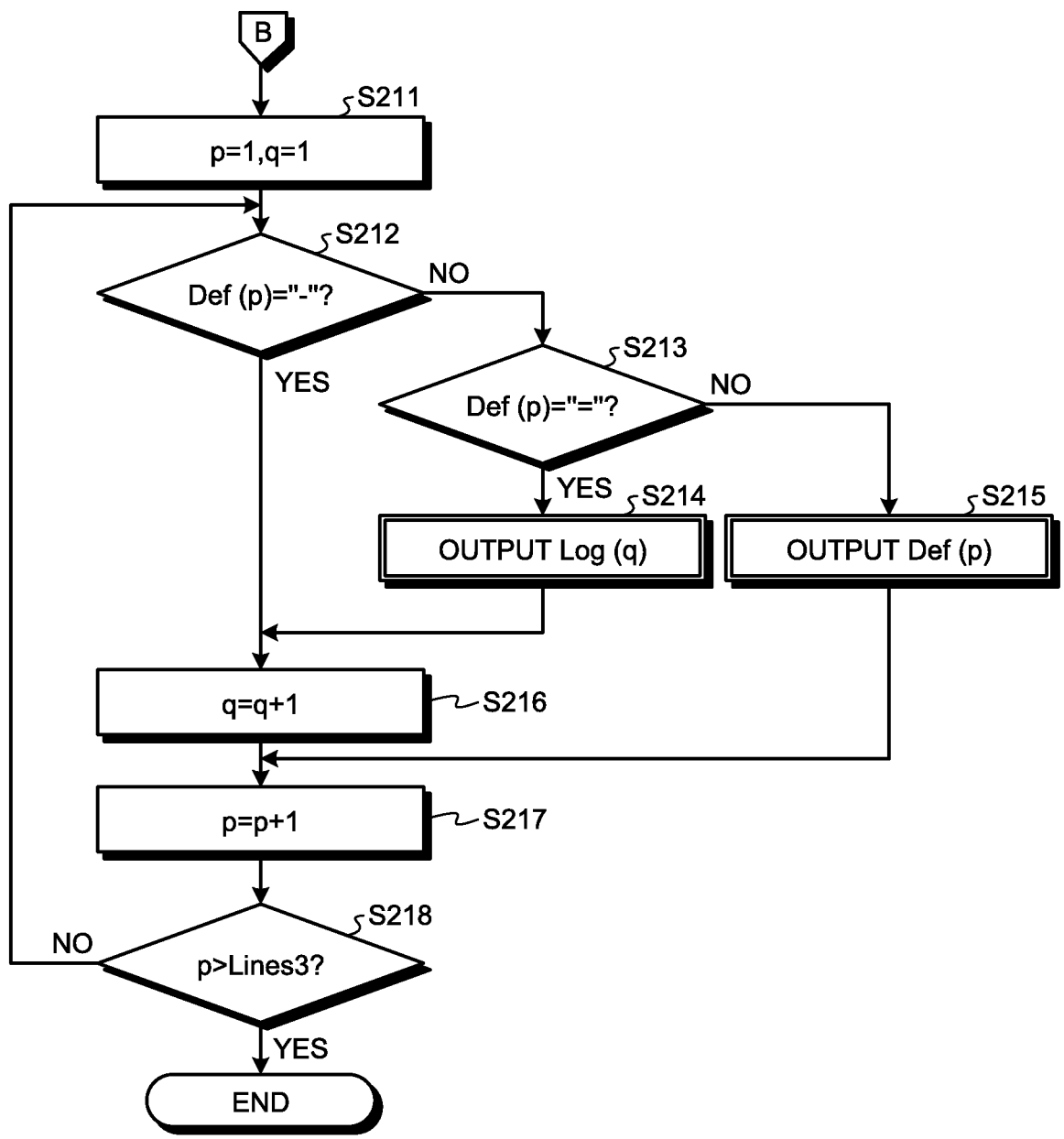
FIG. 17 is a flowchart illustrating a procedure of decoding processing of log data.

Next, the decoding processing operation of the log decoding unit 84 will be described. FIGS. 16 and 17 are flowcharts illustrating the procedure of the decoding processing of log data. This decoding processing is started after a series of log differential data to be output each time a corresponding event is executed from a log file is extracted and stored in the log differential storage unit 82.

First, as shown in the flowchart of FIG. 16, the log decoding unit 84 outputs a header label (step S201) and inputs the header label to the output device 90. The header label having been output is input also to the log information storage unit 83 at the same time, and, until decoding of the entire log data of one event is completed, the data having been stored until then are held in the log information storage unit 83, and the header label having been input is stored temporarily as a separate log message column. The header label includes, as in a header label 121 described above, for example, the event name and the number of events, i.e., the number of times of execution of a series of decoding.

Next, the decoding processing is switched by the header label 111 stored in the log differential storage unit 82 (step S202). If the sign added to the event name in the header label 111 is (R), i.e., the log message having been output at the time of execution of the event is recorded as it is (raw data) (step S202; Yes), it is checked whether the number of lines (Lines3) of the log differential message column 112 is 0 (step S203). If Lines3 is 0 (step S203; Yes), the processing ends. This means that no log message has been output in execution of the event.

On the other hand, if Lines3 is other than 0 (step S203; No), the log decoding unit 84 sets 1 to a variable p indicating the line position of the differential message column 112 (step S204). Next, the log decoding unit 84 outputs a log message (Def(p)) in the p-th line of the log differential message column 112 of the log differential storage unit 82 (step S205), and inputs the log message to the output device 90. The log message (Def(p)) having been output is input also to the log information storage unit 83 at the same time, and is added after the header label described above and temporarily stored in the separate log message column.

Next, after adding 1 to the variable p (step S206), the log decoding unit 84 checks whether the variable p is larger than Lines3 (step S207). If the variable p is equal to or smaller than Lines3 (step S207; No), the processing returns to step S205 to configure a loop for repeating the output of the log message (Def(p)). On the other hand, if the variable p is larger than Lines3 (step S207; Yes), the processing ends. Due to this, the decoding of the entire log data of one event is completed, and hence the content of the log information storage unit 83 is overwritten and updated by the separate log message column temporarily stored in the log information storage unit 83. The processing so far corresponds to the case of FIGS. 12 and 15 described above.

On the other hand, if the sign added to the event name of the header label 111 stored in the log differential storage unit 82 is not Raw Data (R) (step S202; No), the processing transitions to the decoding processing illustrated in FIG. 17.

In the processing of FIG. 17, first, the variable p indicating the line position of the log differential message column 112 is set to 1, and a variable q indicating the line position of a log message column 122 having been decoded is set to 1 (step S211). Subsequently, the log decoding unit 84 checks whether the differential data Def(p) having been symbolized in the p-th line of the log differential message column 112 includes the minus sign (−) (step S212). If the minus sign (−) is included (step S212; Yes), the log decoding unit 84 adds 1 to the variable q (step S216), and then adds 1 to the variable p (step S217). This means that if the differential data Def(p) includes the minus sign (−), the log message of the previous event stored in the log information storage unit 83 does not exist in the subsequent event, and therefore the log decoding unit 84 advances one line ahead the line positions p and q to be referred to without outputting anything.

On the other hand, if the differential data Def(p) does not include the minus sign (−) (step S212; No), the log decoding unit 84 checks whether the differential data Def(p) includes the equal sign (=) (step S213). If the equal sign (=) is included (step S213; Yes), a log message (Log(q)) in the q-th line stored in the log information storage unit 83 is output from the log decoding unit 84 (step S214) and input to the output device 90. The log message (Log(q)) having been output is input also to the log information storage unit 83 at the same time, but is added to a separate log message column temporarily stored. Thereafter, the line positions p and q to be referred to are advanced one line ahead through the steps S216 and S217.

If the differential data Def(p) does not include the equal sign (=) (step S213; No), the differential data Def(p) is the log message itself, and therefore the log decoding unit 84 outputs the Def(p) to the output device 90 (step S216). The Def(p) having been output is input also to the log information storage unit 83 at the same time, but is added to a separate log message column temporarily stored. In this case, since it is a log message newly appearing in the subsequent event which does not exist in the previous event, the processing proceeds to step S217, and 1 is added only to the variable p indicating the line position of the log differential message column 112.

Finally, it is checked whether the variable p is larger than the number of lines Lines3 of the log differential message column 112 (step S218). If the variable p is equal to or smaller than Lines3 (step S218; No), the processing returns to step S212 to configure a loop for repeating decoding. If the variable p is larger than Lines3 (step S218; Yes), all the log differential message columns 112 have been decoded, and hence the processing ends. Due to this, the decoding of the entire log data of one event is completed, and hence the content of the log information storage unit 83 is overwritten and updated by the separate log message column temporarily stored in the log information storage unit 83. The processing so far corresponds to the case of FIGS. 13 and 14.

FIG. 18 is a diagram illustrating a compressed data group saved in a file of the recording device and a series of log data group of the event A having been restored side by side. A compressed data group 130 saved in a file of the recording device is log data compressed in order of execution of a plurality of events, and includes compressed data of the event B in addition to the event A. In the present embodiment, the compressed data of the event B is restored by the log restoration unit for the event B. In addition, in a series of log data group 140 of the event A having been restored, the log data of the event A is restored in order of execution of the event. Therefore, log data of another type of event (event B) is not mixed in the log data group of the event A having been restored, and the log data can be easily restored.

While the embodiments of the present disclosure have been described above, the present disclosure is not limited to the above embodiments.

According to the present disclosure, efficient compression of log recording information can be realized while maintaining the readability of the log recording information by obtaining the differential between the log data in units of events.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. A log output device comprising:
a storage unit that stores, in units of events, log data of a plurality of different events occurring during execution of an application;
a log information output unit that outputs, as log recording information, differential data between log data of a newest event and log data of a latest event which is a same type of event as the newest event and which occurs temporally latest to the newest event and is stored in the storage unit;
a log information storage unit that stores log data of a previous event that has occurred earlier temporally; and
a log data output unit that outputs log data of a subsequent event by restoring the log data from log recording information which is differential data between log information of the subsequent event which is a same type of event as log data of the previous event and which has occurred after the previous event and log information of the previous event, and log data of the previous event recorded in the log information storage unit.

2. The log output device according to claim 1, wherein the log information output unit enables to output sentence information of a log message explaining a content of a log included in the log recording information by gradually switching the log message to simple word information and character information in accordance with a free space of a recording device in which the log recording information which is the differential data of the log data is recorded.

3. The log output device according to claim 1, wherein in a case in which log data of the newest event and log data of the latest event include an identical log message, or in a case in which a log message included in log data of the latest event has been deleted from log data of the newest event, the log information output unit outputs the log recording information in which the log message is indicated by respective predetermined signs.

4. The log output device according to claim 1, wherein the log information output unit outputs log data of the newest event as the log recording information in a case in which an amount of data of the differential data is larger than an amount of data of log data of the newest event.

5. A log output method comprising:
storing in a storage unit, in units of events, log data of a plurality of different events occurring during execution of an application;
outputting, as log recording information, differential data between log data of a newest event and log data of a latest event which is a same type of event as the newest event and which occurs temporally latest to the newest event and is stored in the storage unit;
storing log data of a previous event that has occurred earlier temporally; and
outputting log data of a subsequent event by restoring the log data from log recording information which is differential data between log information of the subsequent event which is a same type of event as log data of the previous event and which has occurred after the previous event and log information of the previous event, and log data of the previous event recorded in the log information storage unit.

6. A non-transitory computer readable recording medium storing therein a log output program causing a computer to execute:
a step of storing in a storage unit, in units of events, log data of a plurality of different events occurring during execution of an application;
a step of outputting, as log recording information, differential data between log data of a newest event and log data of a latest event which is a same type of event as the newest event and which occurs temporally latest to the newest event and is stored in the storage unit;
a step of storing log data of a previous event that has occurred earlier temporally; and
a step of outputting log data of a subsequent event by restoring the log data from log recording information which is differential data between log information of the subsequent event which is a same type of event as log data of the previous event and which has occurred after the previous event and log information of the previous event, and log data of the previous event recorded in the log information storage unit.

* * * * *